US009450827B2

(12) United States Patent
Udou et al.

(10) Patent No.: US 9,450,827 B2
(45) Date of Patent: Sep. 20, 2016

(54) NETWORK SELECTION SUPPORTING METHOD AND NETWORK SELECTION SUPPORTING APPARATUS

(75) Inventors: Satoshi Udou, Toyko (JP); Kazuhiko Korai, Tokyo (JP); Masahiro Asao, Tokyo (JP); Makoto Sasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 556 days.

(21) Appl. No.: 13/700,648

(22) PCT Filed: Jan. 12, 2012

(86) PCT No.: PCT/JP2012/050499
§ 371 (c)(1),
(2), (4) Date: Nov. 28, 2012

(87) PCT Pub. No.: WO2012/096349
PCT Pub. Date: Jul. 19, 2012

(65) Prior Publication Data
US 2013/0070643 A1    Mar. 21, 2013

Related U.S. Application Data

(63) Continuation of application No. PCT/JP2011/050463, filed on Jan. 13, 2011.

(51) Int. Cl.
*H04L 12/24*       (2006.01)
*G06F 3/0481*      (2013.01)
*G06F 3/0484*      (2013.01)

(52) U.S. Cl.
CPC ............... *H04L 41/12* (2013.01); *H04L 41/00* (2013.01); *H04L 41/145* (2013.01); *H04L 41/20* (2013.01);

(Continued)

(58) Field of Classification Search
CPC ..... H04L 41/12; H04L 41/145; H04L 41/22; G06F 3/04817; G06F 3/0484; G06F 3/04847
See application file for complete search history.

(56) References Cited

U.S. PATENT DOCUMENTS 5,825,651 A * 10/1998 Gupta et al. ................... 700/103
5,872,567 A *  2/1999 Amro .................... G06F 3/0481
                                                    715/800

(Continued)

FOREIGN PATENT DOCUMENTS

CN        101706819 A      5/2010
DE    102006059829 A1      6/2008

(Continued)

OTHER PUBLICATIONS

German Office Action, dated Sep. 13, 2013, Patent Application No. 11 2012 000 476.0.

(Continued)

*Primary Examiner* — Eric J Bycer
(74) *Attorney, Agent, or Firm* — Sughrue Mion, PLLC

(57)    ABSTRACT

To support selection of a communication system of a network applied to an FA system of a user, a network selection supporting method according to an embodiment of the present invention includes a condition displaying step of displaying, on a condition input screen, one or a plurality of selection conditions set in advance related to the communication system of the network applied to the FA system, a condition receiving step of receiving an input of a selection condition desired by the user among the selection conditions displayed on the condition input screen, a communication system searching step of searching through a communication system database and finding a communication system matching the input selection condition, and a communication system list displaying step of displaying a search result of the communication system on the communication system list display screen as a list.

30 Claims, 34 Drawing Sheets

(52) U.S. Cl.
CPC ............. *H04L 41/22* (2013.01); *G06F 3/0484* (2013.01); *G06F 3/04817* (2013.01); *G06F 3/04847* (2013.01)

(56) References Cited

U.S. PATENT DOCUMENTS

| | | | | |
|---|---|---|---|---|
| 6,002,854 | A * | 12/1999 | Lynch et al. ....................... | 703/1 |
| 6,300,948 | B1 * | 10/2001 | Geller et al. ................... | 715/866 |
| 6,404,445 | B1 * | 6/2002 | Galea et al. ................... | 715/853 |
| 6,704,917 | B1 * | 3/2004 | Curran et al. ................ | 716/102 |
| 6,829,703 | B1 * | 12/2004 | Caswell et al. .................... | 713/1 |
| 6,865,524 | B1 * | 3/2005 | Shah et al. ...................... | 703/13 |
| 7,188,333 | B1 * | 3/2007 | LaMotta .............. | G06Q 10/087 705/28 |
| 7,512,595 | B1 * | 3/2009 | McBride ........... | G06F 17/30286 |
| 2002/0087423 | A1 * | 7/2002 | Carbrey Palango et al. .. | 705/26 |
| 2002/0165701 | A1 * | 11/2002 | Lichtenberg ........ | G06F 17/5095 703/7 |
| 2004/0073573 | A1 * | 4/2004 | Hopkins .................... | 707/104.1 |
| 2005/0144271 | A1 * | 6/2005 | Shirane et al. .............. | 709/223 |
| 2005/0149879 | A1 * | 7/2005 | Jobs ...................... | G06F 3/0481 715/796 |
| 2005/0228517 | A1 * | 10/2005 | Tomita ............................ | 700/87 |
| 2005/0251748 | A1 * | 11/2005 | Gusmorino et al. .......... | 715/713 |
| 2006/0168436 | A1 * | 7/2006 | Campbell et al. ................. | 713/1 |
| 2006/0178864 | A1 * | 8/2006 | Khanijo et al. ................. | 703/20 |
| 2006/0206217 | A1 | 9/2006 | Fujii | |
| 2006/0246788 | A1 * | 11/2006 | Ewing .................. | G06F 9/5061 439/894 |
| 2006/0259503 | A1 * | 11/2006 | Bradateanu ....... | G06F 17/30398 |
| 2006/0271876 | A1 * | 11/2006 | Holmes ............... | G06F 3/04847 715/771 |
| 2008/0229197 | A1 * | 9/2008 | Branson ................ | G06F 9/4446 715/705 |
| 2009/0019383 | A1 * | 1/2009 | Riley et al. .................... | 715/764 |
| 2009/0125835 | A1 * | 5/2009 | Vaughan et al. .............. | 715/781 |
| 2009/0240713 | A1 * | 9/2009 | Jia et al. ........................ | 707/100 |

FOREIGN PATENT DOCUMENTS

| | | |
|---|---|---|
| EP | 1918794 A1 | 5/2008 |
| JP | 2002-108989 A | 4/2002 |
| JP | 2002-222227 A | 8/2002 |
| JP | 2005-327237 A | 11/2005 |
| JP | 2006-268834 A | 10/2006 |

OTHER PUBLICATIONS

Wikipedia: Bildschirm (Screen), version of Jan. 15, 2010, 11:36 (searched on Jul. 11, 2013) Internet URL: http://de.wikipedia.org/w/index.php?title=Bildschirm&oldid=69334331>.

Duden Universalworterbuch (German dictionary): Mehrzahl (plurality), 7th edition, Bibliographisches Institut GmbH, Mannheimn 2011.

Communication dated Dec. 18, 2014, issued by the State Intellectual Property Office of the People's Republic of China in corresponding Chinese Application No. 201280001493.X.

Communication dated Mar. 7, 2016 from the State Intellectual Property Office of the P.R.C. in counterpart application No. 201280001493.X.

* cited by examiner

FIG.4

| CATEGORY | OPTION | COMMUNICATION SYSTEM ||||||
| --- | --- | --- | --- | --- | --- | --- | --- |
| | | NETWORK A | NETWORK B | NETWORK C | NETWORK D | NETWORK E | NETWORK F |
| 1. CABLE | OPTICAL CABLE | O | | | | | |
| | TWISTED CABLE | O | O | O | | O | O |
| | FLAT CABLE | | | | O | | |
| 2. CONNECTION METHOD | RING TYPE | O | | | O | | |
| | BUS TYPE | O | O | O | O | O | O |
| | STAR TYPE | O | O | O | | O | |
| | ONE TO ONE | O | O | O | O | O | O |
| 3. TOTAL EXTENSION | MAXIMUM 15 m | O | O | O | O | O | O |
| | MAXIMUM 50 m | O | O | O | O | O | O |
| | MAXIMUM 100 m | O | O | O | | | |
| | MAXIMUM 500 m | O | O | O | | | |
| 4. NUMBER OF CONNECTED PRODUCTS | ONE TO ONE | O | O | O | O | | O |
| | UP TO 16 | O | O | O | O | O | O |
| | UP TO 64 | O | O | O | | | |
| | UP TO 120 | O | | | | | |
| 5. NUMBER OF INPUT AND OUTPUT POINTS PER ONE PRODUCT | UP TO 16 POINTS | O | O | O | O | | O |
| | UP TO 32 POINTS | O | O | O | O | | O |
| | UP TO 32k POINTS | O | O | O | | | |
| 6. COMMUNICATION SPEED | UP TO 56 kbps | O | O | O | | | |
| | UP TO 1 Mbps | O | O | O | | O | O |
| | UP TO 10 Mbps | O | O | O | | O | O |
| | UP TO 1 Gbps | O | O | | | | |

FIG.5

| PRODUCT NAME | COMMUNICATION SYSTEM | | | | | |
|---|---|---|---|---|---|---|
| | NETWORK A | NETWORK B | NETWORK C | NETWORK D | NETWORK E | NETWORK F |
| PRODUCT a | ○ | | | | | |
| PRODUCT b | | | ○ | | | |
| PRODUCT c | | | ○ | | | |
| PRODUCT d | | | | ○ | | |
| PRODUCT e | | ○ | | | | |
| PRODUCT f | | | | | ○ | |
| PRODUCT g | | ○ | | ○ | | ○ |
| PRODUCT h | | | | ○ | ○ | |
| PRODUCT i | | | | | | |
| PRODUCT j | ○ | | | | | |
| PRODUCT k | | | | | ○ | ○ |
| PRODUCT l | | | | | | |
| PRODUCT m | | ○ | | | | |

FIG.6

| PRODUCT NAME | STORAGE DESTINATION OF EXTERNAL VIEW | SCHEMATIC EXPLANATION OF PRODUCT | STORAGE DESTINATION OF DETAILED INFORMATION |
|---|---|---|---|
| PRODUCT a | PRODUCT a.jpg | SPECIFICATIONS a1, SPECIFICATIONS a2, ··· | PRODUCT a.html |
| PRODUCT b | PRODUCT b.jpg | SPECIFICATIONS b1, SPECIFICATIONS b2, ··· | PRODUCT b.html |
| PRODUCT c | PRODUCT c.jpg | SPECIFICATIONS c1, SPECIFICATIONS c2, ··· | PRODUCT c.html |
| PRODUCT d | PRODUCT d.jpg | SPECIFICATIONS d1, SPECIFICATIONS d2, ··· | PRODUCT d.html |
| PRODUCT e | PRODUCT e.jpg | SPECIFICATIONS e1, SPECIFICATIONS e2, ··· | PRODUCT e.html |
| PRODUCT f | PRODUCT f.jpg | SPECIFICATIONS f1, SPECIFICATIONS f2, ··· | PRODUCT f.html |
| PRODUCT g | PRODUCT g.jpg | SPECIFICATIONS g1, SPECIFICATIONS g2, ··· | PRODUCT g.html |
| PRODUCT h | PRODUCT h.jpg | SPECIFICATIONS h1, SPECIFICATIONS h2, ··· | PRODUCT h.html |
| PRODUCT i | PRODUCT i.jpg | SPECIFICATIONS i1, SPECIFICATIONS i2, ··· | PRODUCT i.html |
| PRODUCT j | PRODUCT j.jpg | SPECIFICATIONS j1, SPECIFICATIONS j2, ··· | PRODUCT j.html |
| PRODUCT k | PRODUCT k.jpg | SPECIFICATIONS k1, SPECIFICATIONS k2, ··· | PRODUCT k.html |
| PRODUCT l | PRODUCT l.jpg | SPECIFICATIONS l1, SPECIFICATIONS l2, ··· | PRODUCT l.html |
| PRODUCT m | PRODUCT m.jpg | SPECIFICATIONS m1, SPECIFICATIONS m2, ··· | PRODUCT m.html |

FIG.13

| 1. CABLE | NOT DESIGNATED ▼ | |
|---|---|---|
| | NOT DESIGNATED | |
| | OPTICAL CABLE | |
| F5 | TWISTED CABLE | |
| | FLAT CABLE | |

FIG.14

| 1. CABLE | NOT DESIGNATED ▼ | |
|---|---|---|
| | NOT DESIGNATED | |
| | OPTICAL CABLE | TROUBLE PREVENTION IS EASY |
| F5 | TWISTED CABLE | AVAILABILITY IS BETTER |
| | FLAT CABLE | WIRING IS EASY |

FIG.15

F1 — SELECTION CONDITION:

| 1. CABLE | TWISTED CABLE ▼ | 4: NUMBER OF CONNECTED PRODUCTS | NOT DESIGNATED ▼ |
| 2. CONNECTION METHOD | STAR TYPE ▼ | 5. NUMBER OF INPUT AND OUTPUT POINTS PER ONE PRODUCT | NOT DESIGNATED ▼ |
| 3. TOTAL EXTENSION | NOT DESIGNATED ▼ | 6. COMMUNICATION SPEED | NOT DESIGNATED ▼ |

○ CLEAR CONDITIONS — F7

FIG.18

SELECTION CONDITIONS:

USE
- CONTROL INPUT AND OUTPUT DEVICES
- COMMUNICATE BETWEEN CONTROLLERS
- CONTROL SAFETY DEVICES
- SYNCHRONOUSLY CONTROL DRIVING DEVICES
- COMMUNICATE WITH INFORMATION SYSTEM
- CONNECT DISPLAY DEVICES (HMI)
- ACCESS FROM INTERNET

1. CABLE — OPTICAL CABLE ▽
2. CONNECTION METHOD — NOT DESIGNATED ▽
3. TOTAL EXTENSION — NOT DESIGNATED ▽
4: NUMBER OF CONNECTED PRODUCTS — NOT DESIGNATED ▽
5. NUMBER OF INPUT AND OUTPUT POINTS PER ONE PRODUCT — NOT DESIGNATED ▽
6. COMMUNICATION SPEED — NOT DESIGNATED ▽
7. POINT OF SELECTION — NO SETTING ▽

- NO SETTING
- WANT TO UPDATE DATA AT STABLE PERIOD
- WANT TO USE WITH LESS LABOR
- WANT TO VISUALLY CHECK COMMUNICATION STATUS
- WANT TO READ AND WRITE PROJECT OF CONTROLLER
- WANT TO LOG DATA
- WANT TO CONNECT PARTNER PRODUCT (OPEN NETWORK) AS WELL

○ CLEAR CONDITIONS

F1, F15

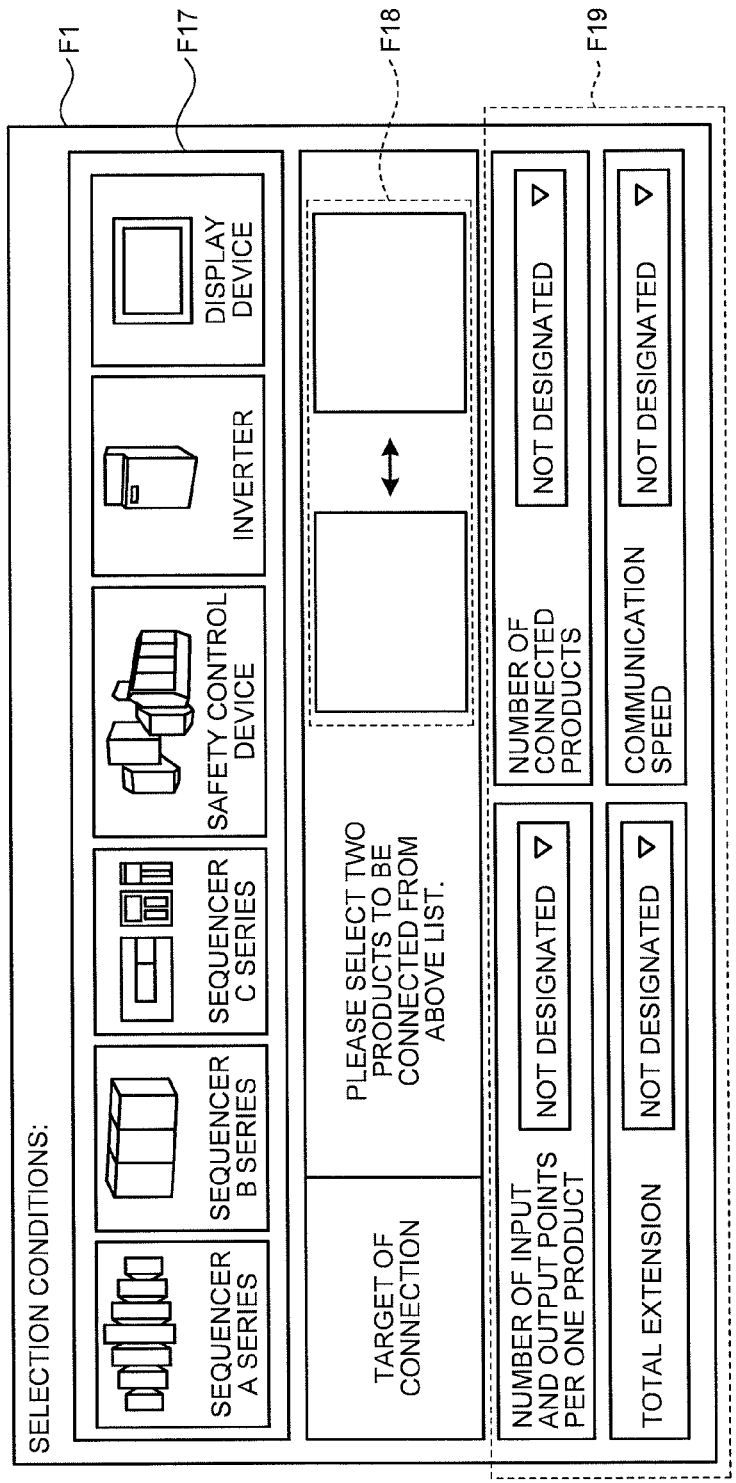

FIG.26

| PRODUCT NAME | TYPE OF PRODUCT | COMMUNICATION SYSTEM ||||||
|---|---|---|---|---|---|---|---|
| | | NETWORK A | NETWORK B | NETWORK C | NETWORK D | NETWORK E | NETWORK F |
| PRODUCT a | SEQUENCER A SERIES | O | | | | | |
| PRODUCT b | SEQUENCER B SERIES | | | O | | | |
| PRODUCT c | SEQUENCER C SERIES | | | O | | | |
| PRODUCT d | SEQUENCER A SERIES | | O | | O | | |
| PRODUCT e | SEQUENCER C SERIES | | | | | | |
| PRODUCT f | SAFETY CONTROL DEVICE | | | | | O | |
| PRODUCT g | INVERTER | | | | O | | O |
| PRODUCT h | SAFETY CONTROL DEVICE | | O | | | O | |
| PRODUCT i | SEQUENCER A SERIES | | | | O | | |
| PRODUCT j | DISPLAY DEVICE | O | | | | | |
| PRODUCT k | SEQUENCER B SERIES | | | | | | O |
| PRODUCT l | SAFETY CONTROL DEVICE | | | | | O | |
| PRODUCT m | INVERTER | | O | | | | |

FIG.28
| CATEGORY | OPTION | IMAGE | EXPLANATORY SENTENCE |
|---|---|---|---|
| 1. CABLE | OPTICAL CABLE |  | TROUBLE PREVENTION IS EASY |
| | TWISTED CABLE | 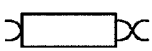 | AVAILABILITY IS BETTER |
| | FLAT CABLE | 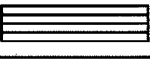 | WIRING IS EASY |
| 2. CONNECTION METHOD | RING TYPE | 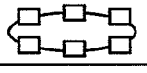 | ROBUST AGAINST TROUBLE |
| | BUS TYPE | 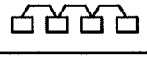 | EXTENSION IS EASY |
| | STAR TYPE |  | ADDITION IS EASY |
| | ONE TO ONE | 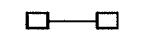 | BASIC CONFIGURATION |

FIG. 29

| CATEGORY | OPTION | COMMUNICATION SYSTEM ||||||
|---|---|---|---|---|---|---|---|
| | | NETWORK A | NETWORK B | NETWORK C | NETWORK D | NETWORK E | NETWORK F |
| USE | CONTROL INPUT AND OUTPUT DEVICES | | O | O | | | |
| | COMMUNICATE BETWEEN CONTROLLERS | O | O | O | | | O |
| | CONTROL SAFETY DEVICE | | | | | O | |
| | SYNCHRONOUSLY CONTROL DRIVING DEVICES | | | | O | | |
| | COMMUNICATE WITH INFORMATION SYSTEM | O | O | O | | O | |
| | CONNECT DISPLAY DEVICE (HMI) | O | O | O | | | O |
| | ACCESS FROM INTERNET | O | | O | | | O |
| CABLE | OPTICAL CABLE | O | | | | O | |
| | TWISTED CABLE | O | O | O | | O | O |
| | FLAT CABLE | | | | O | | |
| CONNECTION METHOD | RING TYPE | | | | O | | O |
| | BUS TYPE | O | O | O | O | O | O |
| | STAR TYPE | | O | O | | | |
| | ONE TO ONE | O | O | O | O | O | O |
| TOTAL EXTENSION | MAXIMUM 15 m | O | O | O | O | O | O |
| | MAXIMUM 50 m | O | O | O | O | O | O |
| | MAXIMUM 100 m | O | O | O | | | O |
| | MAXIMUM 500 m | O | | | | | |
| NUMBER OF CONNECTED PRODUCTS | ONE TO ONE | O | O | O | O | O | O |
| | UP TO 16 | O | O | O | O | O | O |
| | UP TO 64 | O | O | O | | | |
| | UP TO 120 | O | O | | | | |
| NUMBER OF INPUT AND OUTPUT POINTS PER ONE PRODUCT | UP TO 16 POINTS | O | O | O | O | O | O |
| | UP TO 32 POINTS | O | O | O | O | | O |
| | UP TO 32k POINTS | O | O | O | | | |
| COMMUNICATION SPEED | UP TO 56 kbps | O | O | O | O | O | O |
| | UP TO 1 Mbps | O | O | O | | O | O |
| | UP TO 10 Mbps | O | O | O | | O | |
| | UP TO 1 Gbps | O | O | | | | |
| POINT OF SELECTION | WANT TO UPDATE DATA AT STABLE PERIOD | O | O | O | O | O | |
| | WANT TO USE WITH LESS LABOR | O | O | O | O | O | |
| | WANT TO VISUALLY CHECK COMMUNICATION STATUS | O | O | | | | |
| | WANT TO READ AND WRITE PROJECT OF CONTROLLER | O | O | O | | | O |
| | WANT TO LOG DATA | O | O | O | | | O |
| | WANT TO CONNECT PARTNER PRODUCT (OPEN NETWORK) AS WELL | O | O | O | | O | |

FIG.30

| PRODUCT NAME | COMMUNICATION SYSTEM | | | | | | USE | | | | | | |
|---|---|---|---|---|---|---|---|---|---|---|---|---|---|
| | NETWORK A | NETWORK B | NETWORK C | NETWORK D | NETWORK E | NETWORK F | CONTROL INPUT AND OUTPUT DEVICES | COMMUNICATE BETWEEN CONTROLLERS | CONTROL SAFETY DEVICE | SYNCHRONOUSLY CONTROL DRIVING DEVICES | COMMUNICATE WITH INFORMATION SYSTEM | CONNECT DISPLAY DEVICE (HMI) | ACCESS FROM INTERNET |
| PRODUCT a | O | | | | | | | O | | | O | O | O |
| PRODUCT b | | | O | | | | O | O | | | O | O | O |
| PRODUCT c | | | O | | | | O | O | | | O | O | O |
| PRODUCT d | | | | O | | | | | | | O | | |
| PRODUCT e | | O | | | | | O | O | | | O | O | |
| PRODUCT f | | | | | O | | | | O | | O | | |
| PRODUCT g | | | | O | O | | | | | | O | O | |
| PRODUCT h | | O | | O | | | O | O | O | | O | O | |
| PRODUCT i | | | O | | | | | | | | O | | |
| PRODUCT j | O | | | | | | | | | | O | O | O |
| PRODUCT k | | | | | O | | | O | | | | O | O |
| PRODUCT l | | | | O | | | | | O | | O | | |
| PRODUCT m | | O | | | | | O | O | | | O | O | |

| CATEGORY | OPTION | COMMUNICATION SYSTEM ||||||
|---|---|---|---|---|---|---|---|
| | | NETWORK A | NETWORK B | NETWORK C | NETWORK D | NETWORK E | NETWORK F |
| TYPE OF PRODUCT | SEQUENCER A SERIES | O | | | O | O | |
| | SEQUENCER B SERIES | | | O | | | O |
| | SEQUENCER C SERIES | | O | O | | | |
| | SAFETY CONTROL DEVICE | | O | | | O | |
| | INVERTER | | O | | O | | O |
| | DISPLAY DEVICE | O | | | | | |
| CABLE | OPTICAL CABLE | O | | | | O | |
| | TWISTED CABLE | O | O | O | | O | O |
| | FLAT CABLE | | | | O | | |
| CONNECTION METHOD | RING TYPE | | | | O | | O |
| | BUS TYPE | O | O | O | O | O | O |
| | STAR TYPE | | O | O | | | |
| | ONE TO ONE | O | O | O | O | O | O |
| TOTAL EXTENSION | MAXIMUM 15 m | O | O | O | O | O | O |
| | MAXIMUM 50 m | O | O | O | O | O | O |
| | MAXIMUM 100 m | O | O | O | | | O |
| | MAXIMUM 500 m | O | | | | | |
| NUMBER OF CONNECTED PRODUCTS | ONE TO ONE | O | O | O | O | O | O |
| | UP TO 16 | O | O | O | O | O | O |
| | UP TO 64 | O | O | O | | | |
| | UP TO 120 | O | O | | | | |
| NUMBER OF INPUT AND OUTPUT POINTS PER ONE PRODUCT | UP TO 16 POINTS | O | O | O | O | O | O |
| | UP TO 32 POINTS | O | O | O | O | | O |
| | UP TO 32k POINTS | O | O | O | | | |
| COMMUNICATION SPEED | UP TO 56 kbps | O | O | O | O | O | O |
| | UP TO 1 Mbps | O | O | O | | O | O |
| | UP TO 10 Mbps | O | O | O | | O | |
| | UP TO 1 Gbps | O | O | | | | |

FIG.32

| PRODUCT NAME | TYPE OF PRODUCT | COMMUNICATION SYSTEM | | | | | | POINT OF SELECTION | | | | | |
|---|---|---|---|---|---|---|---|---|---|---|---|---|---|
| | | NETWORK A | NETWORK B | NETWORK C | NETWORK D | NETWORK E | NETWORK F | WANT TO UPDATE DATA AT STABLE PERIOD | WANT TO USE WITH LESS LABOR | WANT TO VISUALLY CHECK COMMUNICATION STATUS | WANT TO READ AND WRITE PROJECT OF CONTROLLER | WANT TO LOG DATA | WANT TO CONNECT PARTNER PRODUCT (OPEN NETWORK) AS WELL |
| PRODUCT a | SEQUENCER A SERIES | O | | | | | | O | O | O | O | O | O |
| PRODUCT b | SEQUENCER B SERIES | | | O | | | | O | O | | O | O | O |
| PRODUCT c | SEQUENCER C SERIES | | | O | | | | O | O | | O | O | O |
| PRODUCT d | SEQUENCER A SERIES | | | | O | | | O | O | | | | |
| PRODUCT e | SEQUENCER C SERIES | | O | | | | | O | O | O | O | O | O |
| PRODUCT f | SAFETY CONTROL DEVICE | | | | O | | | O | O | | | | O |
| PRODUCT g | INVERTER | | | | O | O | | O | O | | | | |
| PRODUCT h | SAFETY CONTROL DEVICE | | O | | O | | | O | O | O | | | O |
| PRODUCT i | SEQUENCER A SERIES | | | | O | | | O | O | | | | |
| PRODUCT j | DISPLAY DEVICE | O | | | | | | O | O | | O | O | |
| PRODUCT k | SEQUENCER B SERIES | | | | | O | | | | | O | O | |
| PRODUCT l | SAFETY CONTROL DEVICE | | | | O | | | O | O | | | | O |
| PRODUCT m | INVERTER | | O | | | | | O | O | O | | | O |

STORED CONDITION FILES

| FILE NAME | STORAGE DATE AND TIME |
|---|---|
| abcde | ○○○○/○○/○○ |
| aabbb | △△△△/△△/△△ |
| ⋮ | ⋮ |

NETWORK SELECTION SUPPORTING METHOD AND NETWORK SELECTION SUPPORTING APPARATUS

CROSS REFERENCE TO RELATED APPLICATIONS

This application is a National Stage of International Application No. PCT/JP2012/050499 filed Jan. 12, 2012, claiming priority based on International Application No. PCT/JP2011/050463 filed Jan. 13, 2011, the contents of all of which are incorporated herein by reference in their entirety.

FIELD

The present invention relates to a method and an apparatus for supporting construction of an FA (factory Automation) system.

BACKGROUND

For example, in the network field related to OA (Office Automation) apparatuses, Ethernet (registered trademark) establishes itself as a de facto standard communication system. On the other hand, in the field of FA systems, many kinds of communication systems are present as selectable communication systems. This is because, for example, FA systems involve various needs concerning function of a communication system, a type of wiring, convenience of the wiring, maximum wiring length, the number of connectable FA products, communication speed, performance of abnormality detection of communication, types of products adapted to the FA system, and the like and there are peculiar circumstances in which, because an FA system to which FA networks and FA products are applied often operates for a long period, it is not easy to change a communication system of a network.

For example, Patent Literature 1 discloses an example of an FA system in which networks in three hierarchies, i.e., a LAN (Local Area Network), a cell network, and a field network are used. For example, the LAN is used for communication between factories, the cell network is used for communication in a factory, and the field network is used for communication in manufacturing facilities in a factory. A communication system is sometimes different for each of the hierarchies. There are sometimes a plurality of options of a communication system in each of the hierarchies.

CITATION LIST

Patent Literature

Patent Literature 1: Japanese Patent Application Laid-open No. 2005-327237

SUMMARY

Technical Problem

As explained above, an FA system is configured by connecting respective FA products via networks. There are a large number of communication systems for the networks for constructing the FA system.

Therefore, in the past, when a user constructs an FA system, to select an appropriate communication system for a network, the user needs to extract, from a plurality of materials such as catalogs, specifications, and user's manuals related to communication systems of a large number of networks and individual FA products, desired specifications such as a function of a communication system, a type of wiring, convenience of the wiring, maximum wiring length, the number of connectable FA products, communication speed, performance of abnormality detection of communication, and types of products adapted to the FA system, compare the desired specifications, and comprehensively determine and select specifications. Therefore, it is not easy to grasp an overview and simply select the communication system. A lot of time and effort is necessary.

As explained above, a lot of time and effort is necessary to select a desired communication system of a network using a large number of selection conditions. Therefore, it is difficult to select the communication system in a short time.

An FA product that the user currently owns or an FA product that the user desires to use in future can be a reason for network selection for the user. However, in materials such as catalogs, specifications, and user's manuals related to individual FA products, network functions are usually treated as additional functions. Therefore, it is difficult for the user to specify a communication system of a network that is suitable for the FA product.

Therefore, for example, when the user constructs production facilities of a factory anew using a network, if the user selects a communication system of a network applied to the construction of the production facilities and FA products arranged in places of the production facilities, the user needs to check materials such as catalogs, specifications, and user's manuals of the FA products, specify communication systems of networks that are suitable for the FA products, and specify communication systems of networks that are suitable for all the FA products in common and, then, select FA products and a communication system of a network taking into account other required selection conditions. Therefore, it is difficult to simply select a communication system of a network in a short time.

Alternatively, when the user adds an FA product anew to production facilities in which a network is already set, to specify a FA product for which the network set in the production facilities is suitable, the user needs to check materials such as catalogs, specifications, and user's manuals of FA products that the user desires to add, specify networks that are suitable for the FA products, and specify an FA product that can be added to the network set in the production facilities and satisfies required selection conditions. Therefore, it is also difficult to simply select, in a short time, an FA product added to the set production facilities.

The present invention has been devised in view of the above problems and it is an object of the present invention to obtain a network selection supporting method and a network selection supporting apparatus for supporting a user in selecting a communication system of a network applied to an FA system.

Solution to Problem

There is provided a network selection supporting method according to an aspect of the present invention including: a condition displaying step of displaying, on a selection condition display screen, one or a plurality of selection conditions set in advance related to a communication system of a network applied to an FA system; a condition receiving step of receiving an input of a selection condition desired by a user among the selection conditions displayed on the selection condition display screen; a communication system searching step of searching through network information in which a correspondence relation between the one or plurality of selection conditions set in advance and the communication system of the network applied to the FA system is recorded and extracting a communication system matching the input selection condition; and a communication system list displaying step of displaying the extracted communication system on the communication system list display screen as a list.

The network selection supporting method further includes: a communication system receiving step of receiving an input for selecting one from the list in which the communication system is displayed on the communication system list display screen; and a communication system explanation displaying step of displaying, on a communication system explanation screen, an explanation of the communication system selected according to the received input.

The network selection supporting method further includes: a product list displaying step of searching through product information in which a correspondence relation between a communication system for a network for an FA and FA products connectable to the communication system is recorded and displaying an FA product connectable to the communication system selected according to the received input on a product list screen as a list.

The network selection supporting method further includes: a step of receiving an input for selecting an FA product displayed on the product list screen as a list; and a step of displaying a detailed explanation of the FA product selected according to the received input.

Advantageous Effects of Invention

With the network selection supporting method according to the present invention, the user can obtain, simply by inputting selection conditions, a list of communication systems that match the conditions. Therefore, the user can perform, with a substantially less labor and in a short time, selection of a communication system of a network applied to an FA system. Therefore, there is an effect that it is possible to support the user in selecting a communication system of a network applied to an FA system.

When the user selects one communication system from the list of the communication systems, explanation of the communication system is displayed. Therefore, there is an effect that the user can grasp characteristics of communication systems and select a communication system with a substantially less labor and in a short time.

When the user selects one communication system from the list of the communication systems, a list of FA products for which the communication system is suitable is displayed. Therefore, there is an effect that the user can comprehensively select, with a substantially less labor and in a short time, a communication system taking into account FA products that are suitable.

Further, from the list of FA products for which the communication system is suitable, more detailed information concerning the FA products is displayed. Therefore, there is an effect that the user can check specifications of the FA products more in detail and select an FA product in a substantially less labor and in a short time.

BRIEF DESCRIPTION OF DRAWINGS

FIG. 4 is a diagram of a data configuration example of a communication system database.

FIG. 5 is a diagram of a data configuration example of a product database.

FIG. 6 is a diagram of a data configuration example of product explanation information.

FIG. 13 is a diagram of an example of a display screen.
FIG. 14 is a diagram of an example of a display screen.
FIG. 15 is a diagram of an example of a display screen.
FIG. 18 is a diagram of an example of a display screen.
FIG. 19 is a diagram of an example of a display screen.
FIG. 26 is a diagram of a data configuration example of a product database in a second embodiment.
FIG. 28 is a diagram of a data configuration example of a connection and cable table.
FIG. 29 is a diagram of a data configuration example of a communication system database in the second embodiment.
FIG. 30 is a diagram of a data configuration example of a product database in the second embodiment.
FIG. 31 is a diagram of a data configuration example of a communication system database in a third embodiment.
FIG. 32 is a diagram of a data configuration example of a product database in the third embodiment.
FIG. 37 is a diagram of display for causing a user to select a condition file.

DESCRIPTION OF EMBODIMENTS

Embodiments of a network selection supporting method according to the present invention are explained in detail below with reference to the drawings. The present invention is not limited by the embodiments.

First Embodiment.

Figure 1:
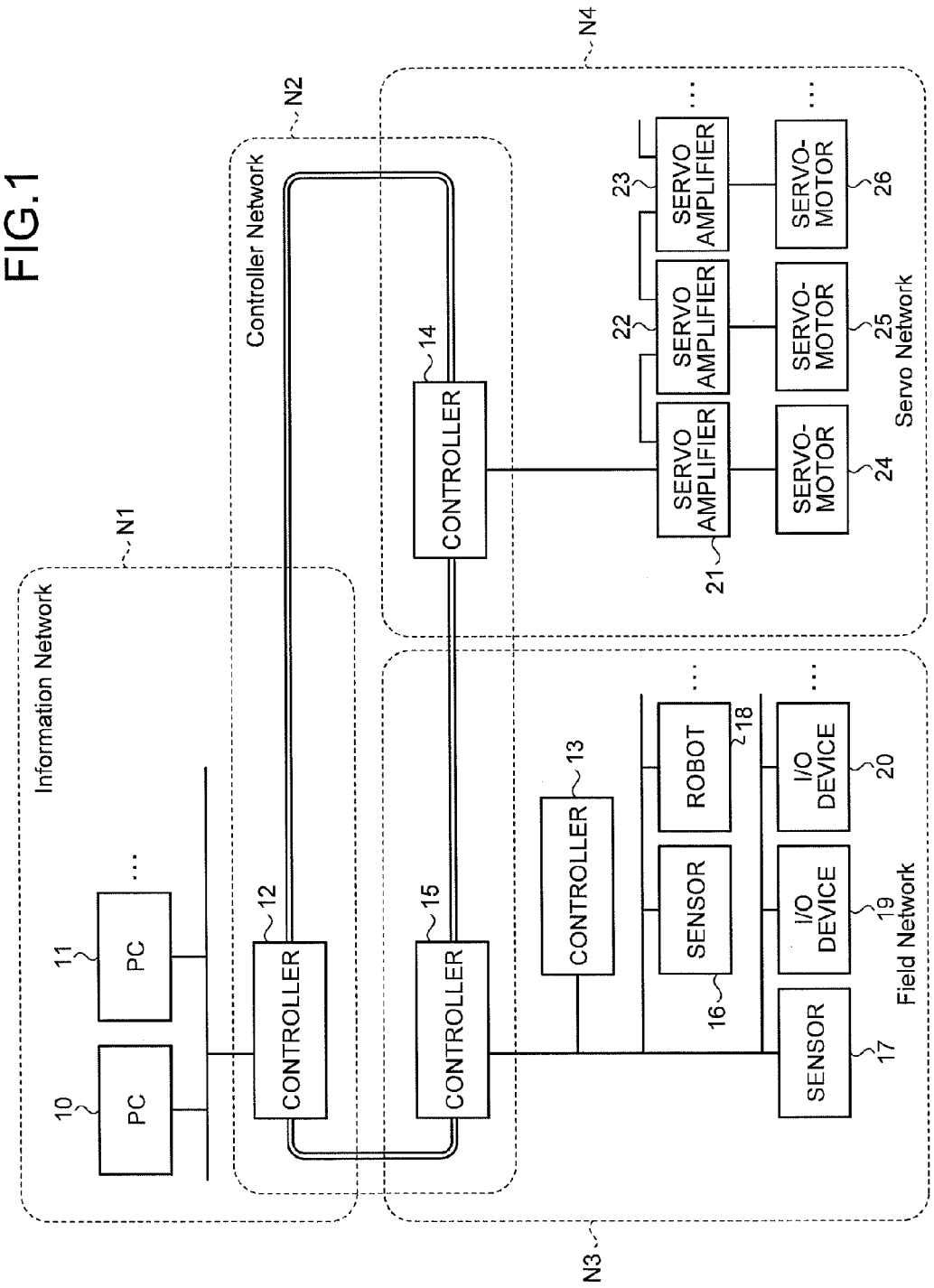
FIG. 1 is a diagram for explaining an example of an FA system.

FIG. 1 is a diagram for explaining an example of an FA system. The FA system shown in FIG. 1 includes PCs (Personal Computers) 10 and 11 that perform information management for the FA system, programmable controllers (hereinafter simply referred to as controllers) 12 to 15, sensors 16 and 17, a robot 18, I/O devices (Input/Output) 19 and 20, servo amplifiers 21 to 23, and servomotors 24 to 26.

The controllers 12 to 15 control the sensors 16 and 17, the robot 18, the I/O devices 19 and 20, and the servo amplifiers 21 to 23 and, for example, acquire information from these devices according to a programmed predetermined procedure. The controllers 12 to 15 apply advanced motion control such as synchronous operation, position tracking, and tandem operation to the servomotors 24 to 26 through the servo amplifiers 21 to 23 using various positioning programs.

The sensors 16 and 17 are controlled by the controller 15 to supply information to the controller 15. The robot 18 executes an operation based on a control instruction from the controller 15. The I/O devices 19 and 20 periodically input, based on a control instruction from the controller 15, ON/OFF information and numerical value information of apparatuses and receive an input from an operator. The servo amplifiers 21 to 23 respectively control, based on an instruction from the controller 14, the operations of the servomotors 24 to 26 respectively connected to the servo amplifiers 21 to 23.

The servomotors 24 to 26 drive, based on instructions from the servo amplifiers 21 to 23 respectively connected to the servomotors 24 to 26, motors using the position, the direction, the posture, and the like of an object as control amounts and perform operations. When the servomotors 24 to 26 include detecting mechanisms, the servomotors 24 to 26 detect the position, the direction, the posture, and the like and feed back the position, the direction, the posture, and the like to the servo amplifiers 21 to 23 connected to the servomotors 24 to 26.

In the FA system shown in FIG. 1, the PCs 10 and 11 and the controller 12 configure an information network N1 for sharing information between the PCs 10 and 11 and the controller 12. The controllers 12, 14, and 15 configure a controller network N2 for sharing information among the controllers. As a representative communication system adoptable in the information network N1, there are Ethernet (registered trademark) and the like. As a representative communication system adoptable in the controller network N2, there are MELSECNET/H, CC-Link IE, FL-net (OPCN-2), and the like.

In the FA system shown in FIG. 1, the controllers 13 and 15, the sensors 16 and 17, the robot 18, and the I/O devices 19 and 20 configure a field network N3 for connecting the devices in cooperation with one another on a real time basis. The controller 14, the servo amplifiers 21 to 23, and the servomotors 24 to 26 configure a servo network N4 for performing synchronous communication higher in speed and higher in punctuality among the controller 14, the servo amplifiers 21 to 23, and the servomotors 24 to 26 and connecting the devices at high speed. As a representative communication system adoptable in the field network N3, there are CC-Link, OPCN-1, and the like. As a representative communication system adoptable in the servo network N4, there are SSCNET (Servo System Controller Network) and the like.

Figure 2:
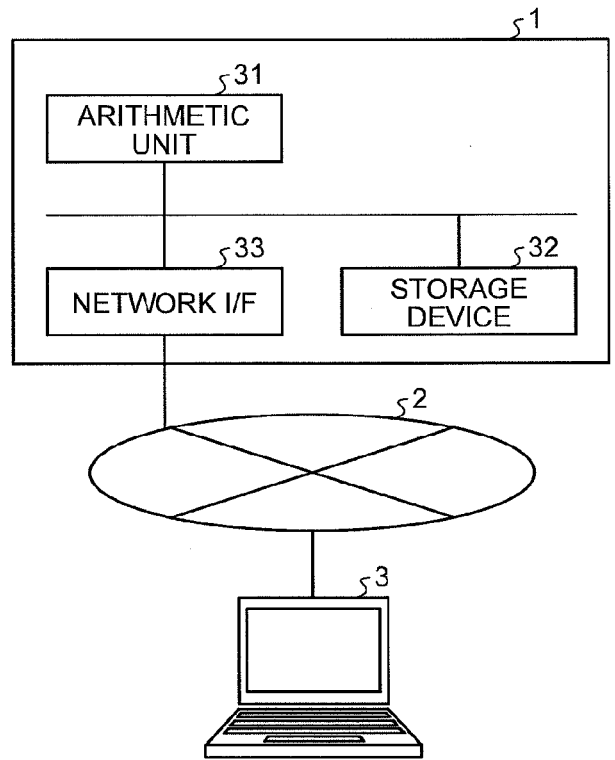
FIG. 2 is a diagram of a representative system configuration example for realizing a network selection supporting method according to an embodiment of the present invention.

FIG. 2 is a diagram of a representative system configuration example for realizing a network selection supporting method according to an embodiment of the present invention. As shown in the figure, the network selection supporting method is realized in an environment in which a server 1 that puts a Web page for network selection support open to the public and a client terminal 3 that executes a Web browser and accesses the server 1 are connected by a network 2 such as Ethernet (registered trademark). When a user operates the client terminal 3 and inputs selection conditions, the server 1 displays a list of communication systems matching the input selection conditions on a display output device of the client terminal 3. In the following explanation, "a communication system of a network" as an object of selection work is simply represented as "communication system".

The server 1 includes an arithmetic unit 31, which is, for example, a CPU (Central Processing Unit), a storage device 32 including a ROM (Read Only Memory), a RAM (Random Access Memory), and an external storage device, and a network interface (I/F) 33 for connecting the arithmetic unit 31 and the storage device 32 to the network 2. The client terminal 3 includes the configuration of a general PC including, in the hardware configuration of the server 1, an input device such as a keyboard and a mouse and a display output device such as a liquid crystal display.

Figure 3:
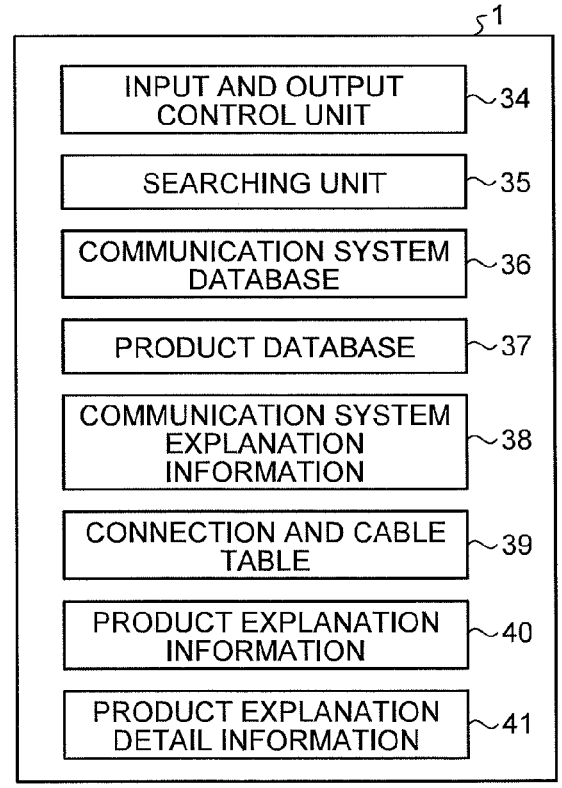
FIG. 3 is a diagram of a functional configuration example of a server.

FIG. 3 is a diagram of a functional configuration example of the server 1. As shown in the figure, the server 1 includes an input and output control unit 34, a searching unit 35, a communication system database 36, a product database 37, communication system explanation information 38, a connection and cable table 39, product explanation information 40, and product explanation detail information 41.

The communication system database 36 is information in which a correspondence relation between selection conditions and communication systems is recorded.

FIG. 4 is a diagram of a data configuration example of the communication system database 36. As shown in the figure, the communication system database 36 includes a data configuration of a table format in which true and false values related to selection conditions are recorded for each of communication systems (a network A, a network B, and the like). In the example shown in FIG. 4, for clarification, circles indicate that individual selection conditions are satisfied. In the first embodiment, the selection conditions managed in the communication system database 36 are roughly classified into categories of "cable", "connection method", "total extension", "number of connected products", "number of input and output points per one product", and "communication speed".

The categories include option lists. Character strings representing options are stored in the option lists. For example, "optical cable", "twisted cable", and "flat cable" are stored in the "cable" category as character strings representing options.

The product database 37 is information in which suitable communication systems are recorded for each of model numbers of products. FIG. 5 is a diagram of a data configuration example of the product database 37. As shown in the figure, the product database 37 includes, concerning each of model numbers of products (product a, product b, and the like), for each of networks, fields in which true and false values indicating whether a communication system of the network is supported. Like the communication system database 36, circles indicate supported communication systems.

The communication system explanation information 38 is detailed information concerning each of communication systems for display output. The product explanation information 40 is detailed information concerning each of products for display output. For example, as shown in FIG. 6, the product explanation information 40 can be stored as information concerning table formats. In a data configuration example shown in FIG. 6, the product explanation information 40 includes a field in which schematic explanation of a product is described for each of model numbers of products and a field in which a link to an address of a storage destination of a file for display output having recorded therein detailed information stored in the product explanation detail information 41 is described.

The input and output control unit 34 executes reception of input information including selection conditions transmitted by the client terminal 3 and transmission of a screen for supporting selection of a communication system to the client terminal 3. The input and output control unit 34 sends the selection conditions received from the client terminal 3 to the searching unit 35.

The searching unit 35 searches through the communication system database 36 and the product database 37 based on the selection conditions sent from the input and output control unit 34. The searching unit 35 sends a search result to the input and output control unit 34.

The input and output control unit 34 and the searching unit 35 are realized by the arithmetic unit 31 and the storage device 32. The communication system database 36, the product database 37, the communication system explanation information 38, the connection and cable table 39, the product explanation information 40, and the product explanation detail information 41 are stored in the storage device 32.

Figure 7:
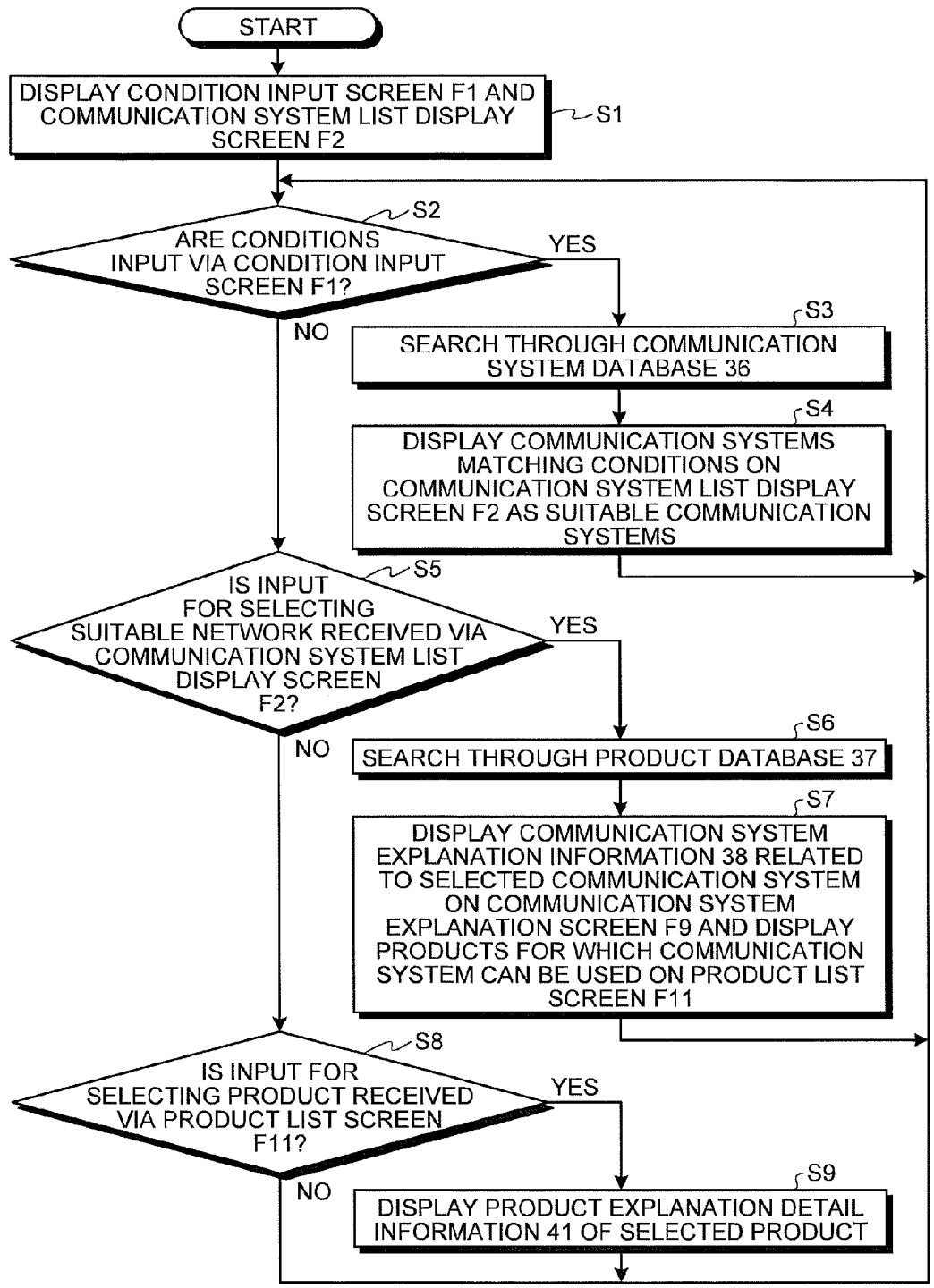
FIG. 7 is a flowchart for schematically explaining a network selection supporting method according to a first embodiment.

A network selection supporting method according to the first embodiment of the present invention is explained with reference to FIGS. 7 to 17 and 28. FIG. 7 is a flowchart for schematically explaining the network selection supporting method according to the first embodiment. FIGS. 8 to 17 are diagrams of example of display screens that the server 1 displays on a display output device of the client terminal 3. FIG. 28 is a diagram of an example of data structure of the connection and cable table 39.

Figure 8:
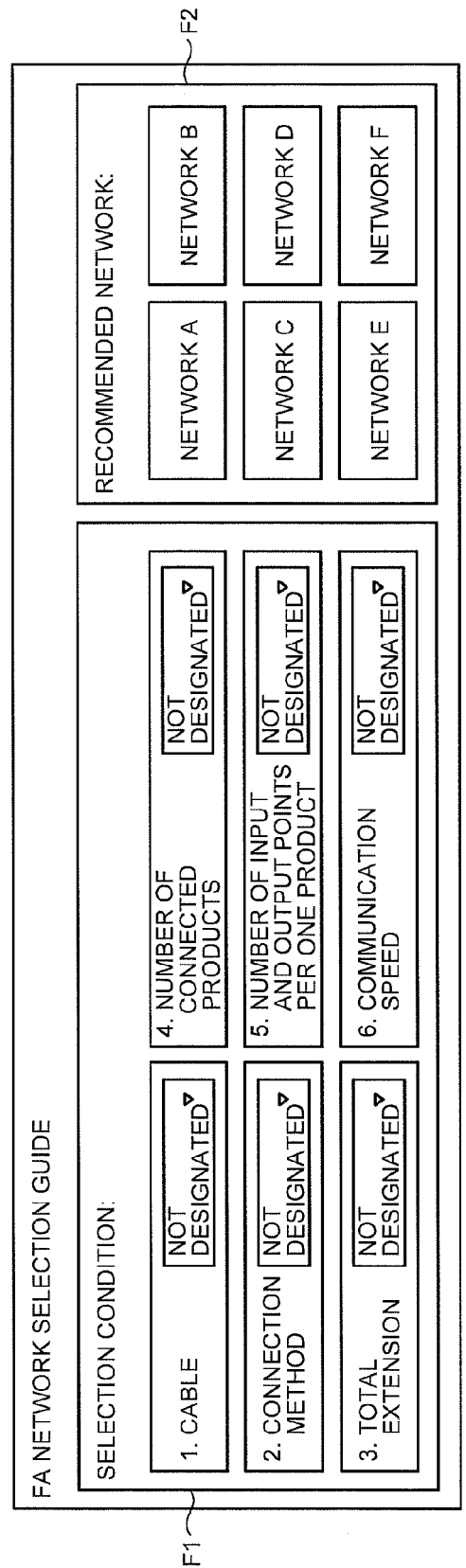
FIG. 8 is a diagram of an example of a display screen.

First, in an initial state, the input and output control unit 34 performs screen display including a condition input screen (a selection condition display screen) F1 and a communication system list display screen F2 shown in FIG. 8 (step S1). The condition input screen F1 is a screen for displaying selection conditions managed by the communication system database 36. The condition input screen F1 is formed to enable a user to select selection conditions using a pointing device.

The input and output control unit 34 monitors an input of selection conditions from the condition input screen F1 (No at step S2). When the input and output control unit 34 receives an input of selection conditions (Yes at step S2), the input and output control unit 34 transfers the received selection conditions to the searching unit 35. The searching unit 35 searches through the communication system database 36 using the transferred selection conditions as search keys (step S3). The searching unit 35 transfers a search result to the input and output control unit 34. The input and output control unit 34 displays communication systems matching the conditions on the communication system list display screen F2 as suitable communication systems (step S4).

The processing at steps S2 to S4 is executed every time selection conditions are input anew. When selection conditions are sequentially input and the input selection conditions are sequentially transferred, at steps S3 and S4, the searching unit 35 searches through the communication system database 36 again using, as AND conditions of selection conditions transferred so far, selection conditions transferred anew, displays communication systems matching the conditions as suitable communication systems, and displays communication systems not matching the conditions as unsuitable communication systems. Alternatively, the searching unit 35 can be configured to not display the communication systems not matching the conditions instead of displaying the unsuitable communication systems. The searching unit 35 can be configured to group the communication systems matching the conditions for each of hierarchies such as an information network N1, a controller network N2, a field network N3, and a servo network N4. Criteria for the grouping do not have to be set for each of the hierarchies.

A button for receiving an input for requesting execution of a search such as a search button can be provided on a display screen shown in FIG. 8. The searching unit 35 can be configured to execute steps S3 and S4 when the searching unit 35 receives the input for request for execution of a search via the button.

Figure 9:
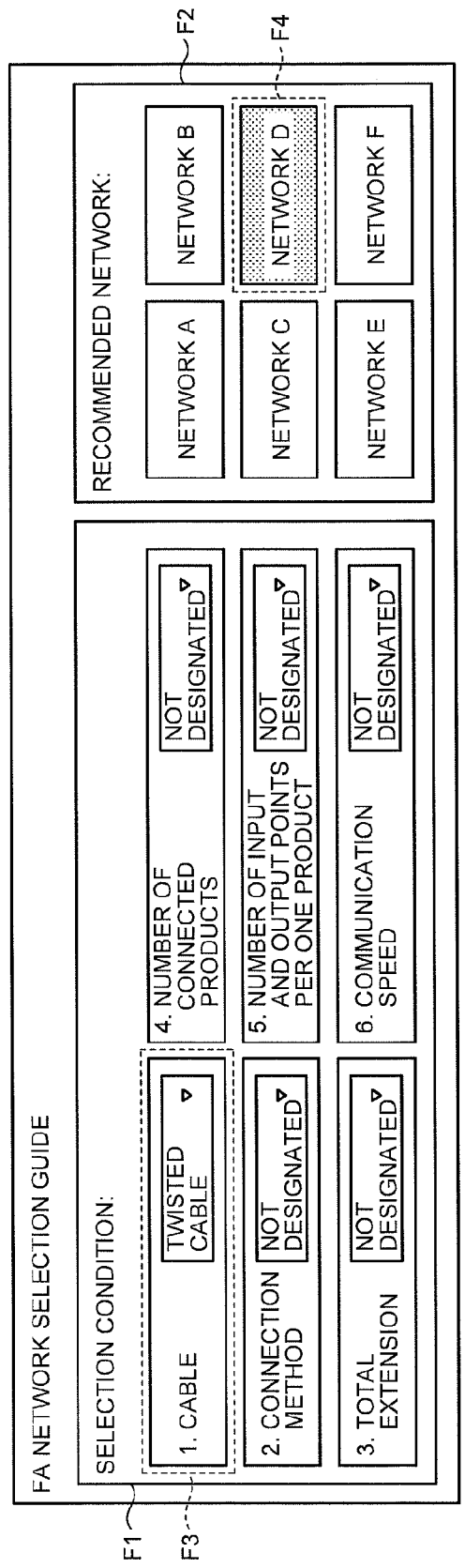
FIG. 9 is a diagram of an example of a display screen.
Figure 10:
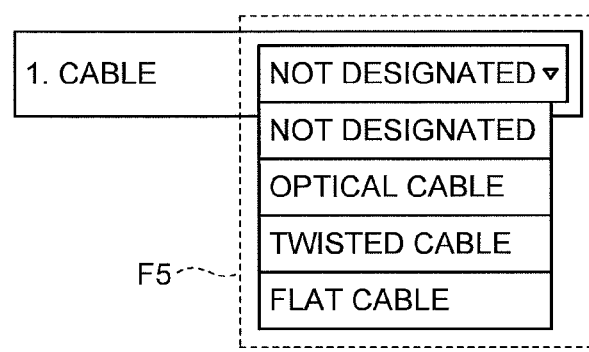
FIG. 10 is a diagram of an example of a display screen.

In FIG. 9, an example of a screen display displayed when a selection conditions related to the "cable" category among the selection conditions displayed on the condition input screen F1 is selected. When a downward triangle of an input box provided on the right of "cable" in an input field F3 related to the "cable" category is pressed, selection conditions belonging to the "cable" category are displayed as a list in a pull-down menu format (a field F5 in FIG. 10). When "twisted cable" of the field F5 is pressed, "twisted cable" in the "cable" category is selected. As shown in FIG. 9, "twisted cable" is displayed in the "cable" category. The respective selection conditions displayed as a list in the field F5 include options F81 associated with the selection conditions in the communication system database 36.

On the other hand, on the communication system list display screen F2, as shown in FIG. 8, networks A to F are displayed as suitable communication systems before a selection condition input. However, when "twisted cable" is selected, as shown in FIG. 9, half-tone dot meshing display (F4 in the figure) indicating that the network D is unsuitable is performed. Only the networks A to C and E and F extracted by a search are displayed as suitable communication systems.

At this point, at step S3, the input and output control unit 34 notifies the searching unit 35 that "twisted cable" is selected in the "cable" category. The searching unit 35 determines, referring to "twisted cable" options F83 of the "cable" category of the information stored in the communication system database 36 shown in FIG. 4, that communication systems marked by circles in the options F83, i.e., communication systems corresponding to the options F83 are the networks A to C and E and F and transfers the networks A to C and E and F to the input and output control unit 34 as a search result. The input and output control unit 34 displays the networks A to C and E and F as suitable communication systems and displays the network D in half-tone dot meshing as an unsuitable communication system.

Figure 11:
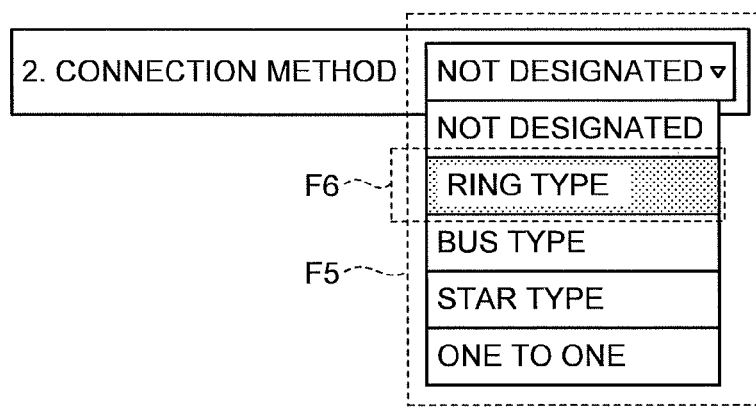
FIG. 11 is a diagram of an example of a display screen.
Figure 12:
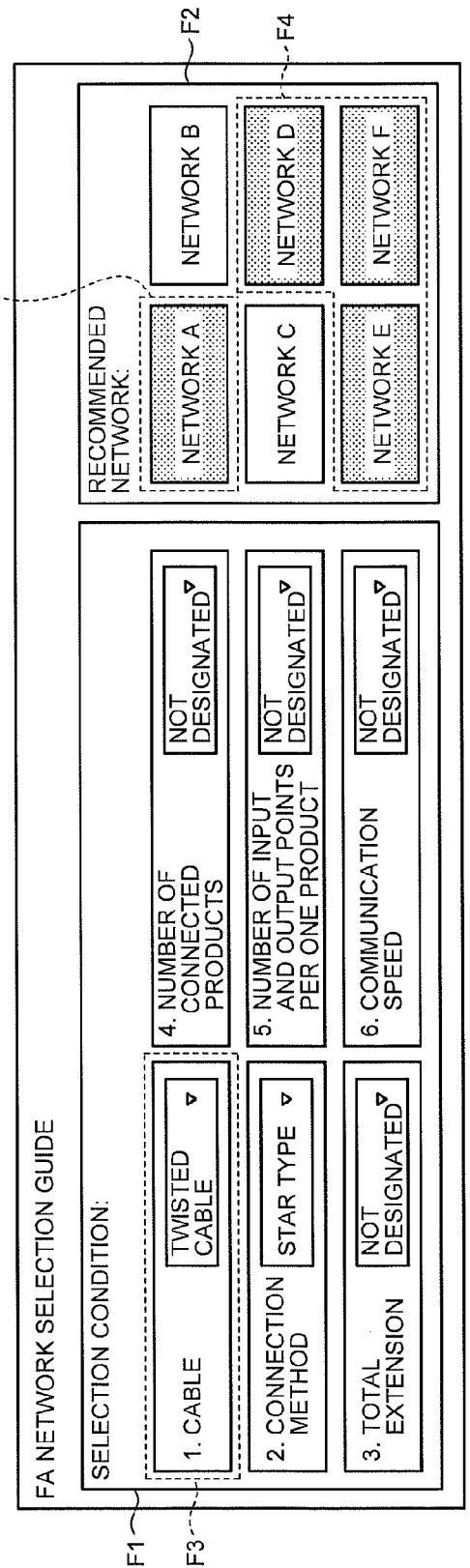
FIG. 12 is a diagram of an example of a display screen.

When a downward triangle of an input box provided on the right of "connection method" in the condition input screen F1 is pressed in the state shown in FIG. 9, selection conditions belonging to the "connection method" category are displayed as a list in a pull-down menu format (the field F5 in FIG. 11). When "star type" of the field F5 is pressed, as shown in FIG. 12, "star type" in the "connection method" category is selected as shown in FIG. 12 and "star type" is displayed in the "connection method" category. The respective selection conditions displayed as a list in the field F5 include options F82 associated with the selection conditions in the communication system database 36.

On the other hand, at this point, on the communication system list display screen F2, as shown in FIG. 12, when "star type" is selected, half-tone dot meshing display (F4 in the figure) indicating that the networks A and D to F are unsuitable communication systems is performed. Only the networks B and C extracted by a search are displayed as suitable communication systems.

At this point, at step S3, the input and output control unit 34 notifies the searching unit 35 that "twisted cable" is selected in the "cable" category and "star type" is selected in the "connection method" category. The searching unit 35 determines, referring to the "twisted cable" options F83 of the "cable" category and "star type" options F84 of the "connection method" category of the information stored in the communication system database 36 shown in FIG. 4, that the networks B and C correspond to the options F83 and the options F84 and transfers the networks B and C to the input and output control unit 34 as a search result. The input and output control unit 34 displays the networks B and C as suitable communication systems and displays the networks A and D to F as unsuitable communication systems in half-tone dot meshing.

Because "twisted cable" is already selected, when the downward triangle of the input box provided on the right of "connection method" is pressed, selection conditions incompatible with the selection conditions of "twisted cable" can be displayed in half-tone dot meshing or can be deleted from the pull-down menu to clearly indicate to the user that the selection conditions are unselectable. The incompatible selection conditions mean one or a plurality of selection conditions under which there is no suitable communication systems if the selection conditions are selected. In FIG. 11, "ring type" corresponds to a selection condition incompatible with selection conditions input earlier. A "ring type" field F6 is displayed in half-tone dot meshing. For the display, for example, it is desirable to perform processing explained below. When the input and output control unit 34 receives an input for opening a pull-down menu, the searching unit 35 performs a reverse lookup search through the communication system database 36 using, as search keys, communication systems currently displayed as suitable communication systems and transfers hit selection conditions in a target category to the input and output control unit 34. Specifically, in the case of this example, the searching unit 35 extracts "bus type", "star type", and "one to one", which are options supported by at least one of the networks A to C and the networks E and F currently displayed as suitable communication systems, from the "connection method" category. The input and output control unit 34 desirably displays only the transferred selection conditions on the pull-down menu or displays a selection condition not transferred from the searching unit 35 in half-tone dot meshing like the field F6.

The server 1 can display, for example, concerning selection conditions of the "cable" category, images corresponding to the selection conditions stored in the connection and cable table 39 on the pull-down menu besides the options F81 (FIG. 13). A data configuration example of the connection and cable table 39 is shown in FIG. 28. When such display is performed, the user can grasp, as characters and visual information, contents meant by items. Therefore, there is an effect that the user can more easily select items appropriately in a short time. Alternatively, concerning the selection conditions of the "cable" category, explanatory sentences can be displayed on the pull-down menu besides the options F81 (FIG. 14). When such display is performed, the user can grasp effects of selection of the items. Therefore, there is an effect that the user can more easily select items appropriately.

As shown in FIG. 15, a "clear conditions" button F7 can be provided on the condition input screen F1. When the input and output control unit 34 receives an input for pressing the button F7, the input and output control unit 34 resets selection conditions input earlier and displays the condition input screen F1 and the communication system list display screen F2 in the initial state shown in FIG. 8, i.e., a state in which selection conditions are not input yet. Because the button F7 is provided, the user can reset, in one operation, one or a plurality of selection conditions selected so far to an initial state. Therefore, it is possible to further reduce time required by the user for operation for selection of a network applied to an FA system.

The input and output control unit 34 monitors an input for selecting one of communication systems displayed as suitable communication systems via the communication system list display screen F2 (No at step S5). When the input and output control unit 34 receives an input for selecting a communication system (Yes at step S5), the input and output control unit 34 transfers the received selection input to the searching unit 35. The searching unit 35 searches through the product database 37 using the transferred communication system as a search key and finds products that support the communication system (step S6). The searching unit 35 transfers a search result to the input and output control unit 34.

The input and output control unit 34 displays, as a list, the communication system explanation information 38 related to the selected communication system and the search result of the searching unit 35 (step S7).

Figure 16:
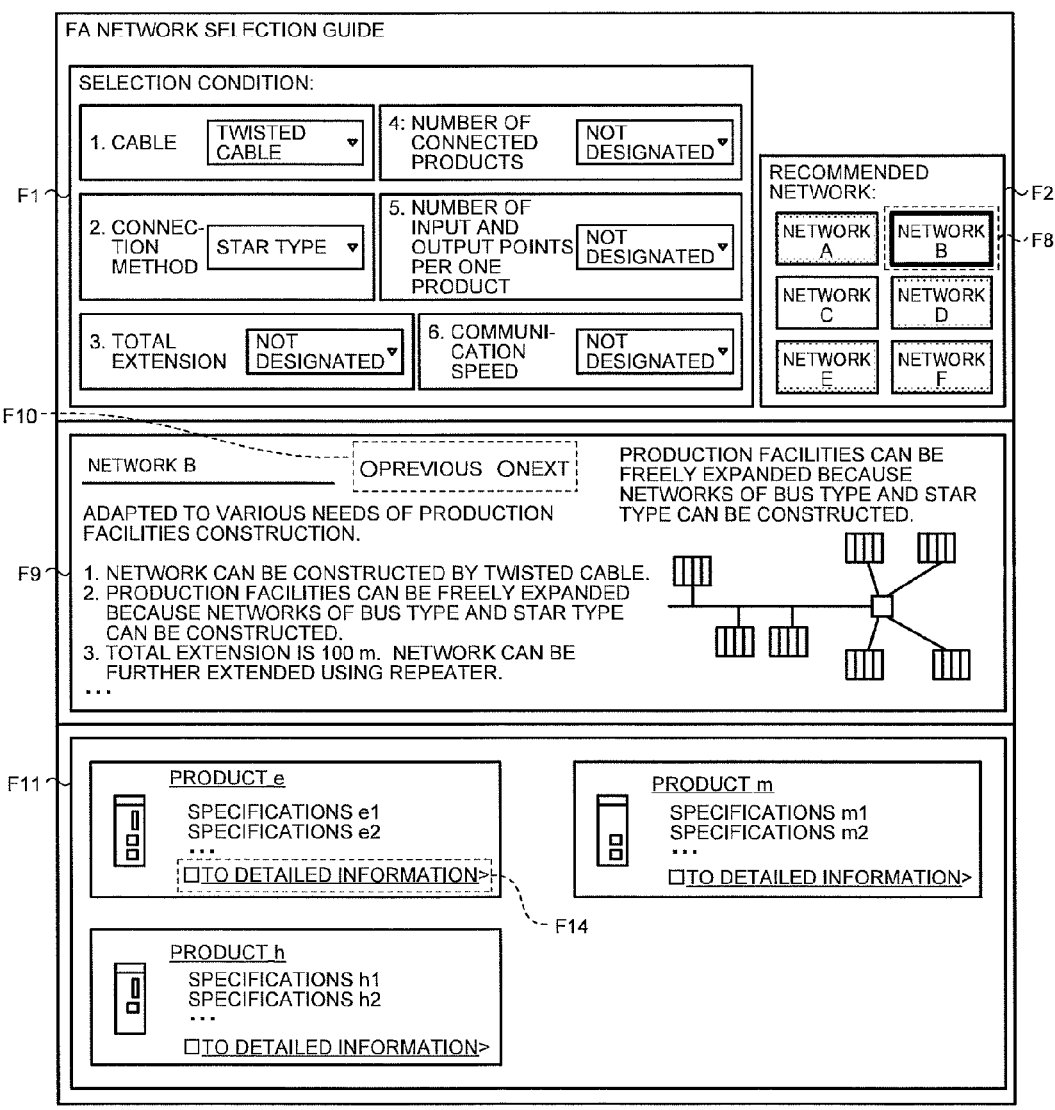
FIG. 16 is a diagram of an example of a display screen.

FIG. 16 is a diagram of an example of the list display of the communication system explanation information 38 and the search result. As shown in the figure, the communication system explanation information related to the selected communication system is displayed on a communication system explanation screen F9. A list of products that support the communication system is displayed on a product list screen F11. More specifically, in FIG. 16, the network B is selected and input and a "network B" button F8 on the condition input screen F1 is actively displayed. An explanation related to the network B is displayed on the communication system explanation screen F9. Products that support the network B are displayed as a list on the product list screen F11. On the product list screen F11, a product name, an external view, a schematic explanation, and an anchor (a "to detailed information" button F14) to a storage destination of detailed information managed by the product explanation information 40 are displayed. Because the network B is selected and input, the searching unit 35 searches through the product database 37 shown in FIG. 5 using "network B" as a search key and obtains a search result that products that support the network B are "product e", "product h", and "product m". The input and output control unit 34 reads out storage destinations of external views, schematic explanations, and storage destination of detailed information respectively associated with "product e", "product h", and "product m" in the product explanation information 40 and displays the read-out respective kinds of information on the product list screen F11.

The communication system explanation screen F9 includes a switching button F10 including a "previous" button and a "next" button. If a plurality of communication systems are displayed as suitable communication systems before a communication system is selected and input at step S5, when the switching button F10 is pressed and input, an operation to be executed when another communication system among the communication systems displayed as the suitable communication systems is selected and input at step S5 is executed. In other words, step S6 is executed using a communication system regarded as selected and input anew. At step S7, the communication system explanation screen F9 and the product list screen F11 are updated. When the "next" button is pressed, the networks are selected in the order of the networks B, C, . . . excluding an unsuitable communication system, i.e., in the order of the networks . . . , B, and A excluding an unsuitable network. The "previous" button is selected in order opposite to the order of the "next" button. Because the button F10 is provided, it is possible to quickly display and check suitable communication systems in order without selecting and inputting communication systems anew on the communication system list display screen F2. Therefore, it is possible to further reduce the time required by the user for operation for selection of a communication system.

The input and output control unit 34 monitors an input for selecting a product via the product list screen F11 (No at step S8). When the input and output control unit 34 receives an input for selecting a product (Yes at step S8), the input and output control unit 34 reads out, based on information concerning a storage destination of detailed information, detailed explanation related to the selected product from the product explanation detail information 41 and displays the detailed explanation (step S9).

Figure 17:
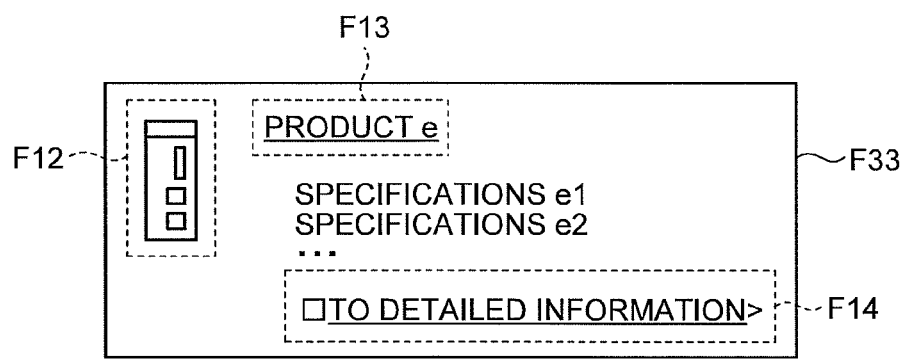
FIG. 17 is a diagram of an example of a display screen.

As shown in FIG. 17, the "to detailed information" button F14 is prepared in a field in which explanation of each product is displayed in the product list screen F11. When the button F14 is pressed, it is regarded that the product is selected. When the "to detailed information" button F14 is pressed, at step S9, the input and output control unit 34 displays display information of a link destination described in a storage destination field of detailed information of the product explanation information 40 shown in FIG. 6. In other words, the user can refer to more detailed information concerning the product by pressing the "to detailed information" button F14. Because the button F14 is provided, the user can simply refer to and grasp in a short time information for determining whether the product satisfies requirements of the user. Therefore, it is possible to further reduce the time required by the user to select a communication system.

Functions equivalent to the "to detailed information" button F14 can be given to an external view F12 and a product name F13 of an individual product displayed on the product list screen F11. Consequently, the user can display visual information or can press a product name to display more detailed information of the product. The user can easily refer to information concerning the product. Therefore, it is possible to further reduce the time required by the user to select a communication system.

As explained above, according to the first embodiment of the present invention, the network selection supporting method includes the condition displaying step (step S1) of displaying one or a plurality of selection conditions set in advance related to a communication system of a network on the condition input screen (the selection condition display screen) F1, the condition receiving step (Yes at step S2) of receiving an input of a selection condition desired by the user among the selection conditions displayed on the condition input screen F1, the communication system searching step (step S3) of searching through the communication system database (network information) 36 and finding communication systems matching the input selection conditions, and the communication system list displaying step (step S4) of displaying a search result of the communication systems on the communication system list display screen F2 as a list. Therefore, when the user simply input selection conditions, a list of the communication systems matching the conditions is displayed. Therefore, the user can obtain in a short time a list of communication systems of networks corresponding to required selection conditions. In other words, the user can support selection of a communication system of a network applied to an FA system.

The network selection supporting method further includes the communication system receiving step (step S5) of receiving an input for selecting one of the communication systems displayed as a list on the communication system list display screen F2 and a communication system explanation displaying step (step S7) of displaying an explanation of the selected communication system on the communication system explanation screen F9. Therefore, even when a plurality of communication systems are displayed on the communication system list display screen F2 as suitable communication systems, even a user unfamiliar with the communication systems can grasp, without consuming a lot of labor, characteristics of the communication systems in a short time and perform selection of a communication system of a network taking into account characteristics other than required selection conditions.

The network selection supporting method further includes the product list displaying step (step S7) of searching through the product database 37, reading out information from the product explanation information 40 based on a result of the search, and displaying products connectable to the selected communication system on the product list screen F11 as a list. Therefore, the user can check, on one screen, information indispensable in selecting a communication system such as selection conditions, characteristics of communication systems, and suitable products, grasp the information, and select a communication system in a short time without consuming a lot of labor.

The network selection supporting method further includes the step (step S8) of receiving an input for selecting products displayed on the product list screen F11 as a list and the step (step S9) of displaying the product explanation detail information 41 of the selected products. Therefore, the user can check more detailed information of suitable products without consuming a lot of labor. Therefore, the user can more appropriately select a communication system.

Second Embodiment.

In a network selection supporting method according to a second embodiment, a selection condition related to "use" and a selection condition related to "point of selection" are added to selection conditions that a user can designate. Specifically, as shown in FIG. 29, a "use" category and a "point of selection" category are added to the communication system database 36. The respective categories include finer options. Options related to the added categories are selectably displayed on the condition input screen F1.

FIG. 18 is a diagram of a display example of the condition input screen F1 in the second embodiment. The "use" category is a category of a selection condition for designating a use of a network. As shown in the figure, in the "use" category, options easy to understand for the user are prepared, such as "control input and output devices", "communicate between controllers", "control safety devices", "synchronously control driving devices", "communicate with information system", "connect display devices (HMI)", and "access from Internet". For example, a network for "communicate between controllers" corresponds to the controller network N2. The network for "synchronously control driving devices" corresponds to the servo network N4.

The "point of selection" category is a category of selection conditions for abstractly designating functions or characteristics of communication systems. For example, as shown in a pull-down menu F15 of FIG. 18, selection conditions "want to update data at stable period", "want to use with less labor", "want to visually check communication status", "want to read and write project of controller", "want to log data", and "want to connect partner product (open network) as well" are prepared. In this way, abstract functions or characteristics of communication systems are set as selection conditions. Consequently, it is possible to facilitate network selection for a user unfamiliar with communication systems.

As explained above, according to the second embodiment of the present invention, suitable communication systems can be searched using uses of networks as selection conditions. Therefore, the user can perform selection more conforming to a use.

Further, communication systems can be searched using functions or characteristics of communication functions as selection conditions. Therefore, it is possible to facilitate network selection for a user unfamiliar with communication systems.

As shown in FIG. 30, a field for recording products match selection conditions belonging to the "use" category can be provided in the product database 37. The input and output control unit 34 can be configured to display, at step S8, on the product list screen F11, a list of products that support a selected and input network and match the selection conditions belonging to the "use" category. Consequently, for example, it is possible to prevent an FA product other than a controller from being displayed on the product list screen F11 when "communicate between controllers" is selected and display only an FA product corresponding to the controller. This makes it easy to accurately grasp a lineup of suitable FA products in a short time and accurately perform comprehensive selection of a communication system.

Third Embodiment.

Figure 20:
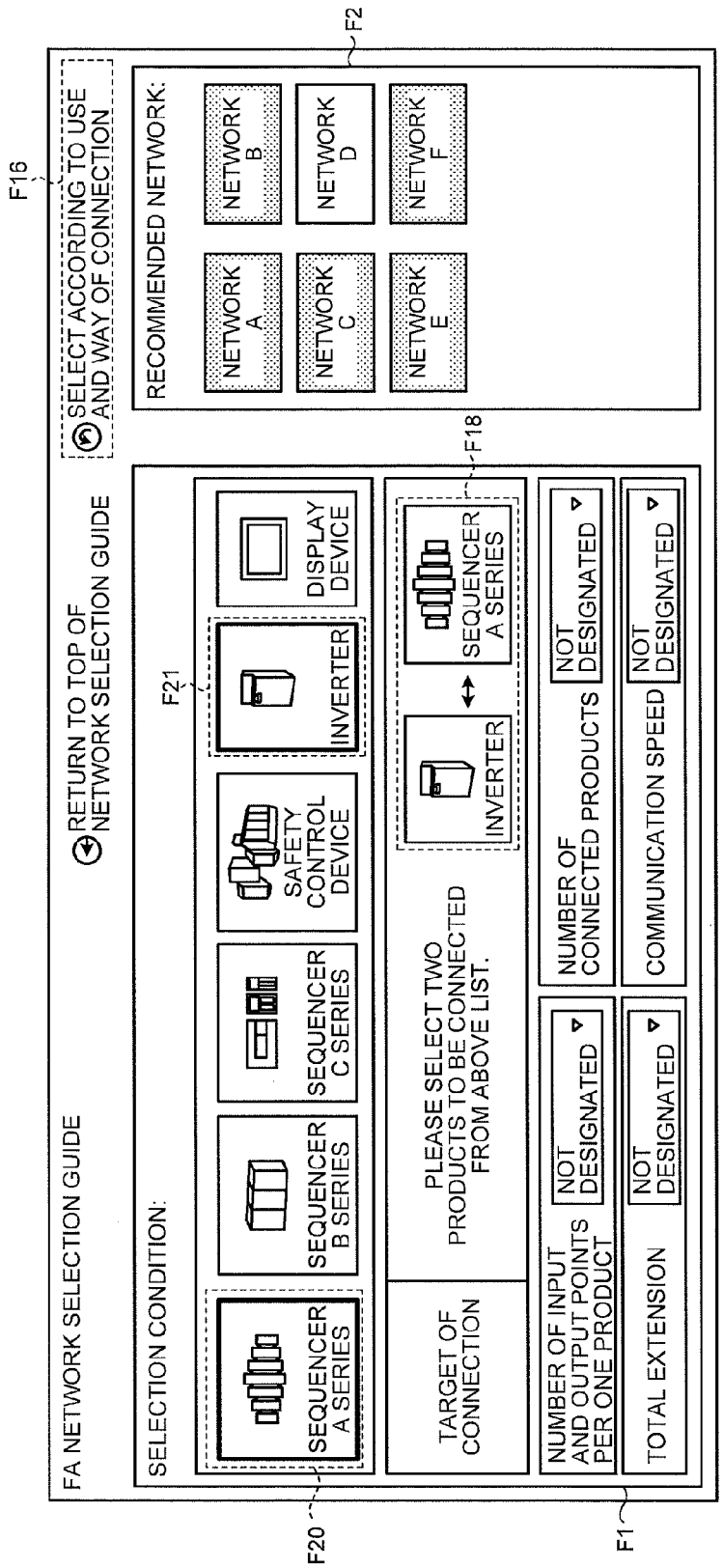
FIG. 20 is a diagram of an example of a display screen.

A third embodiment is different from the first embodiment in that designation of a type of a product can be treated as a selection condition. FIGS. 19 and 20 are diagrams of examples of display screens that the server 1 displays on the display output device of the client terminal 3.

FIG. 19 is a diagram of the condition input screen F1 according to the third embodiment. As shown in the figure, the condition input screen F1 according to the third embodiment includes a product type input screen F17 in which a button is prepared for each type of a product and the type of the product can be selected and input by pressing the button, a selected product display screen F18 on which two types of selected products can be displayed, and a condition input screen F19.

FIG. 20 is a diagram of a state of the condition input screen F1 and a state of the communication system list display screen F2 displayed when "sequencer A series" and "inverter" are selected and input on the product type input screen F17. As shown in the figure, a "sequencer A series" button F20 and an "inverter" button F21 prepared on the product type input screen F17 are actively displayed. "Sequencer A series" and "inverter" are displayed on the selected product display screen F18. The network D is displayed on the communication system list display screen F2 as a suitable network. In other words, it is indicated that the one communication system is a communication system that is suitable for both "sequencer A series" and "inverter".

To treat the designation of a type of a product as a selection condition in this way, as shown in FIG. 31, it is desirable to add a "type of product" category to the selection conditions of the communication system database 36 and add an option representing a type of a product to the category. The searching unit 35 desirably searches through the communication system database 36 using types of one or more products as search keys. Instead, as shown in FIG. 32, the "type of product" category can be added to the product database 37 and types of products can be recorded in the category. The searching unit 35 can be configured to search through the communication system database 36 and the product database 37 at step S3.

When a button selected once and actively displayed on the product type input screen F17 is selected again, the selection can be released. When an image of a type of a product displayed on the selected product display screen F18 is pressed, selection of the pressed type can be released. When two same types are selected and two images of products of the same types are displayed on the selected product display screen F18, if a button of the types actively displayed on the product type input screen F17 are continuously pressed twice, both the two products of the types can be changed to an unselected state. The number of types that can be displayed on the selected product display screen F18 is not limited to two and can be, for example, one or can be three or more. Consequently, a moving distance of a pointing device required for the selection decreases. Therefore, the user can select a communication system with less labor and in a shorter time.

When only a type of a product having only a slave station function is selected, the input and output control unit 34 can display a notification for requiring a master station other than the slave station on the condition input screen F1. The input and output control unit 34 can identifiably display a button of a type of a product in which a master station is present and a type of a product including only a slave function. Consequently, there is an effect that even a user unfamiliar with communication systems can accurately grasp points to be noted concerning selection of an FA apparatus.

As explained above, according to the third embodiment of the present invention, the user can perform the search using types of products as selection conditions. Therefore, for example, a user who constructs production facilities of a factory anew using a network, the user more vaguely specifies a type of a product without specifically specifying a model name of the product. Consequently, the user can exclude, from examination targets of selection, a communication system in which the product of the type cannot be used. The user can narrow down, at an early stage of selection, communication systems that can be targets of selection. Therefore, the user can select a communication system with less labor and in a shorter time.

A user who adds an FA product anew to production facilities in which a network is already set can specify, by designating a communication system and a type of a product, an FA product for which a communication system set in the production facilities is suitable. Therefore, the user can specify a desired FA product with less labor and in a shorter time.

Even when a user has not specifically determined an FA product that the user desires to use in future, the user can switch and display, for each of connectable communication systems, a list of FA products that can be connected to FA products that the user owns. Therefore, the user can select a communication system while switching and checking, for each of the connectable communication systems, the list of connectable FA products. Therefore, the user can grasp the connectable FA products and select a desired communication system with less labor and in a shorter time.

Figure 21:
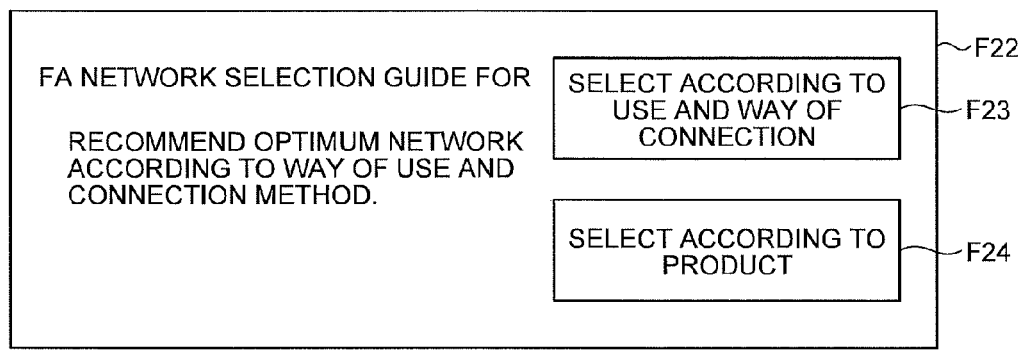
FIG. 21 is a diagram of an example of a display screen.

The user can be enabled to select and display a desired condition input screen F1 from the condition input screens F1 according to the first, second, and third embodiments. For example, a top screen F22 shown in FIG. 21 includes a "select according to use and way of connection" field F23 and a "select according to product" field F24. When the "select according to use and way of connection" field F23 is selected from the top screen F22, the input and output control unit 34 displays the condition input screen F1 and the communication system list display screen F2 in the second embodiment. When the "select according to product" field F24 is selected, the input and output control unit 34 displays the condition input screen F1 and the communication system list display screen F2 in the third embodiment. A plurality of the condition input screens F1 in which selectable selection conditions are different are prepared in this way. Consequently, there is an effect that a policy of selection is further clarified and the user is encouraged to perform appropriate selection.

The input and output control unit 34 can be configured to receive an input for switching the displayed condition input screen F1 to another condition input screen F1 and switch and display the condition input screen F1. For example, as shown in FIG. 20, when the "select according to use and way of connection" button F16 is displayed on the display screen in the third embodiment and the button F16 is pressed, the input and output control unit 34 shifts the display screen to the display screen including the condition input screen F1 and the communication system list display screen F2 in the second embodiment. The input and output control unit 34 displays a "select according to a product" button on the display screen shown in FIG. 8 and switches the display screen to the display screen shown in FIG. 20 when the button is pressed. Consequently, the user can easily switch an input method for selection conditions. Therefore, the user can further reduce the time required for selection of a communication system.

Figure 22:
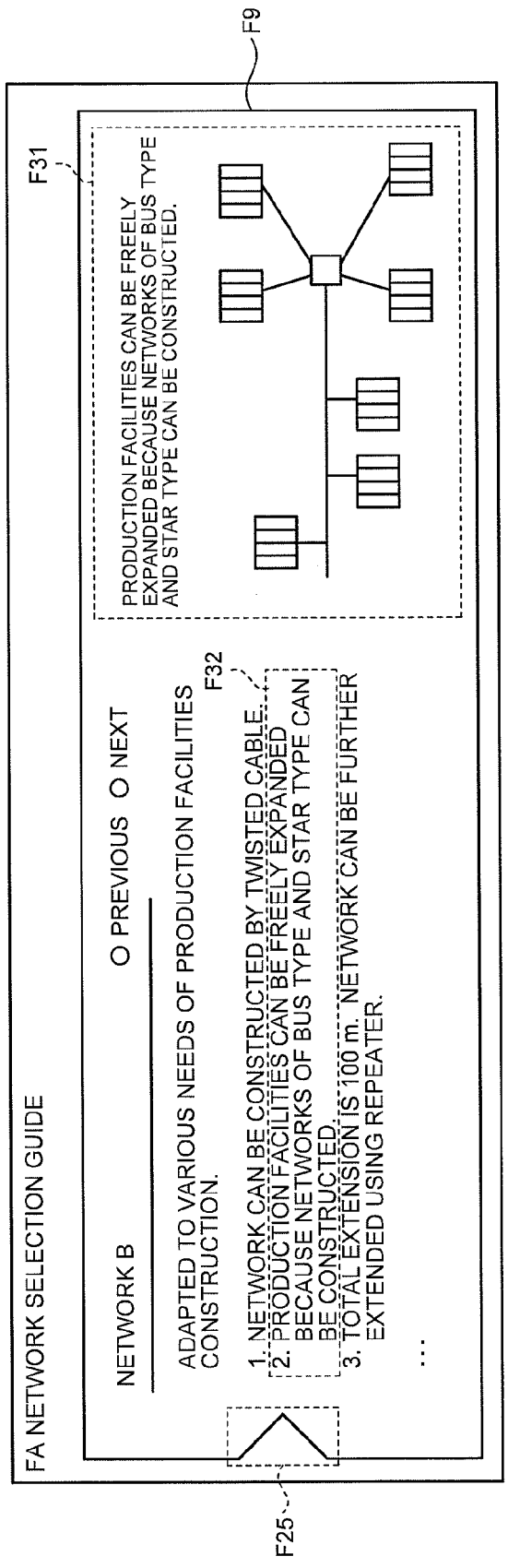
FIG. 22 is a diagram of an example of a display screen.
Figure 23:
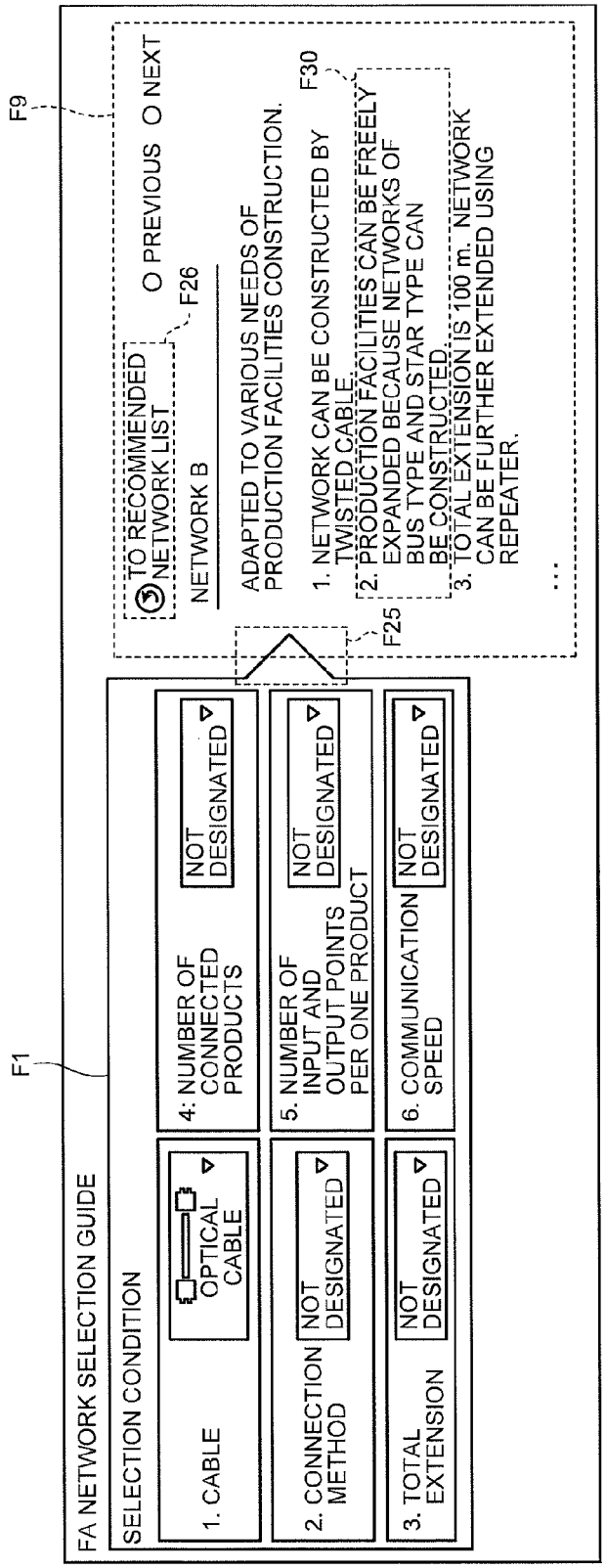
FIG. 23 is a diagram of an example of a display screen.

In the first to third embodiments, as shown in FIG. 22, a folding button F25 can be included in the communication system explanation screen F9. When the input and output control unit 34 displays the communication system explanation screen F9 and the product list screen F11 in the processing at step S7, the input and output control unit 34 can hide the condition input screen F1 and the communication system list display screen F2. When the folding button F25 is pressed, as shown in FIG. 23, the input and output control unit 34 can display the communication system explanation screen F9 in a reduced size and display the hidden condition input screen F1 in a space formed by the reduction in the size of the communication system explanation screen F9. When the folding button F25 is pressed again in the state shown in FIG. 23, the input and output control unit 34 can hide the reduced condition input screen F1 again and reset the state to the display state shown in FIG. 22. A "to recommended network list" button F26 can be provided in the communication system explanation screen F9 as shown in FIG. 23 to give the communication system explanation screen F9 a function of resetting the display screen to the display state shown in FIG. 9 when the "to recommended network list" button F26 is pressed.

The input and output control unit 34 can hide the communication system list display screen F2 and display the communication system explanation screen F9 in the reduced state in the processing at step S7 as shown in FIG. 23. When the folding button F25 is pressed in the state shown in FIG. 23, the input and output control unit 34 can hide the condition input screen F1 and shift the display screen to the display state shown in FIG. 22. At this point, as shown in FIG. 23, a button such as a button F30 can be provided in a title of an explanation item displayed in the reduced communication system explanation screen F9. The input and output control unit 34 can be given a function of, when the button F30 is pressed, hiding the condition input screen F1, shifting the display screen to the display state shown in FIG. 22, and displaying an explanation matching a title selected using the button F30 on the communication system detail explanation display screen F31. As shown in FIG. 22, a button such as a button F32 can be provided in the title of the explanation item displayed in the communication system explanation screen F9 not reduced in size. The communication system explanation screen F9 can be given a function of displaying an explanation matching a title selected with the button F32 on the communication system detailed explanation display screen F31.

For example, when the condition input screen F1, the communication system list display screen F2, and the communication system explanation screen F9 are displayed on one window at a time, the user cannot grasp an entire display content unless the user operates a scroll bar typically prepared at the right end of the window and scrolls the display content. On the other hand, if an unnecessary display content can be hidden as appropriate and the hidden display content can be invoked when necessary as shown in FIGS. 22 and 23, the user can switch the display content simply by pressing the folding button F25 without performing the operation of the scroll bar. Therefore, the user can easily grasp the entire display content. Because the button F26 is provided, the user can display the communication system list display screen F2 by pressing the button F26 once. Therefore, the user can select a communication system in a shorter time. Because the buttons F30 and F32 are provided, the user can switch the display content simply by pressing the buttons F30 and F32 without performing the operation of the scroll bar. Therefore, the user can easily grasp detailed specifications of communication systems with less labor and in a shorter time.

Figure 24:
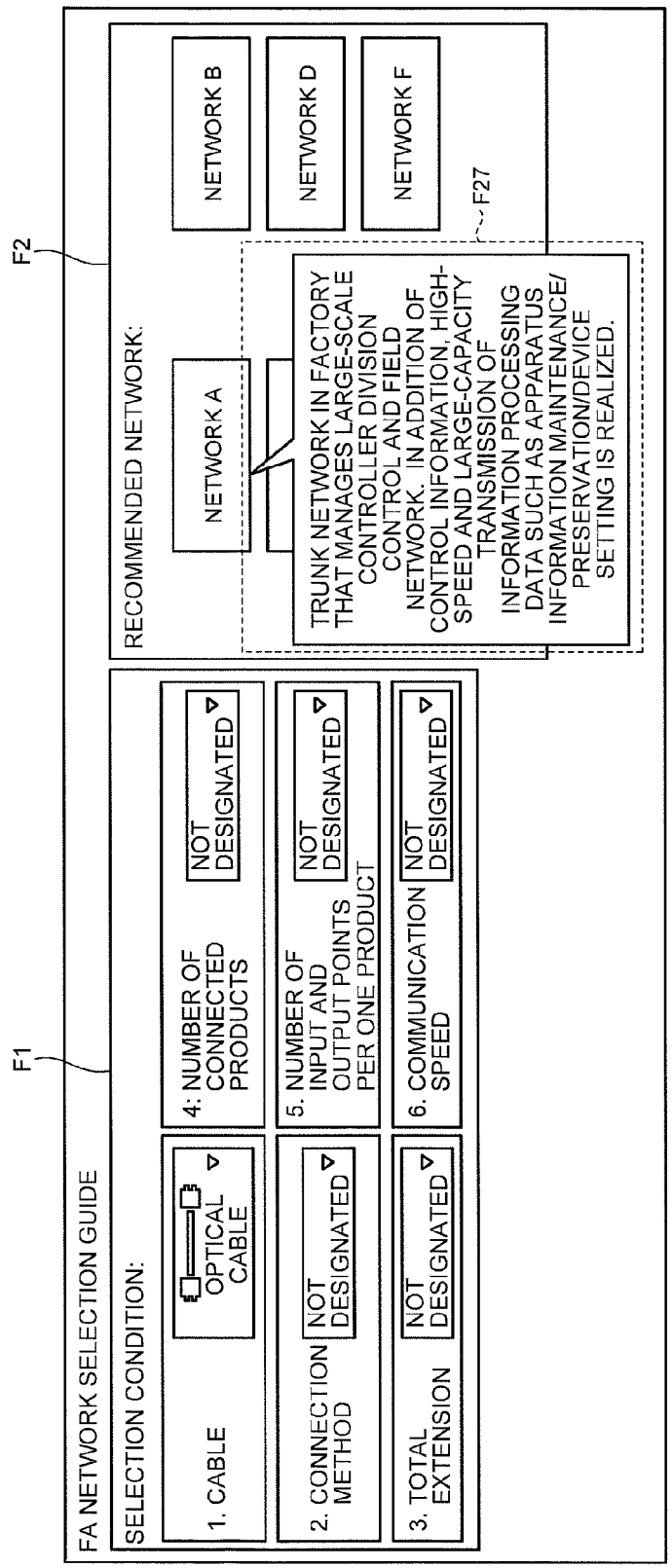
FIG. 24 is a diagram of an example of a display screen.

As shown in FIG. 24, when a cursor is put on a communication system displayed on the communication system list display screen F2, a simple explanation related to the communication system on which the cursor is put can be pop-up displayed (a field F27 in the figure). Consequently, the user can learn an overview of a communication system without selecting and inputting the communication system and invoking the communication system explanation screen F9.

Figure 25:
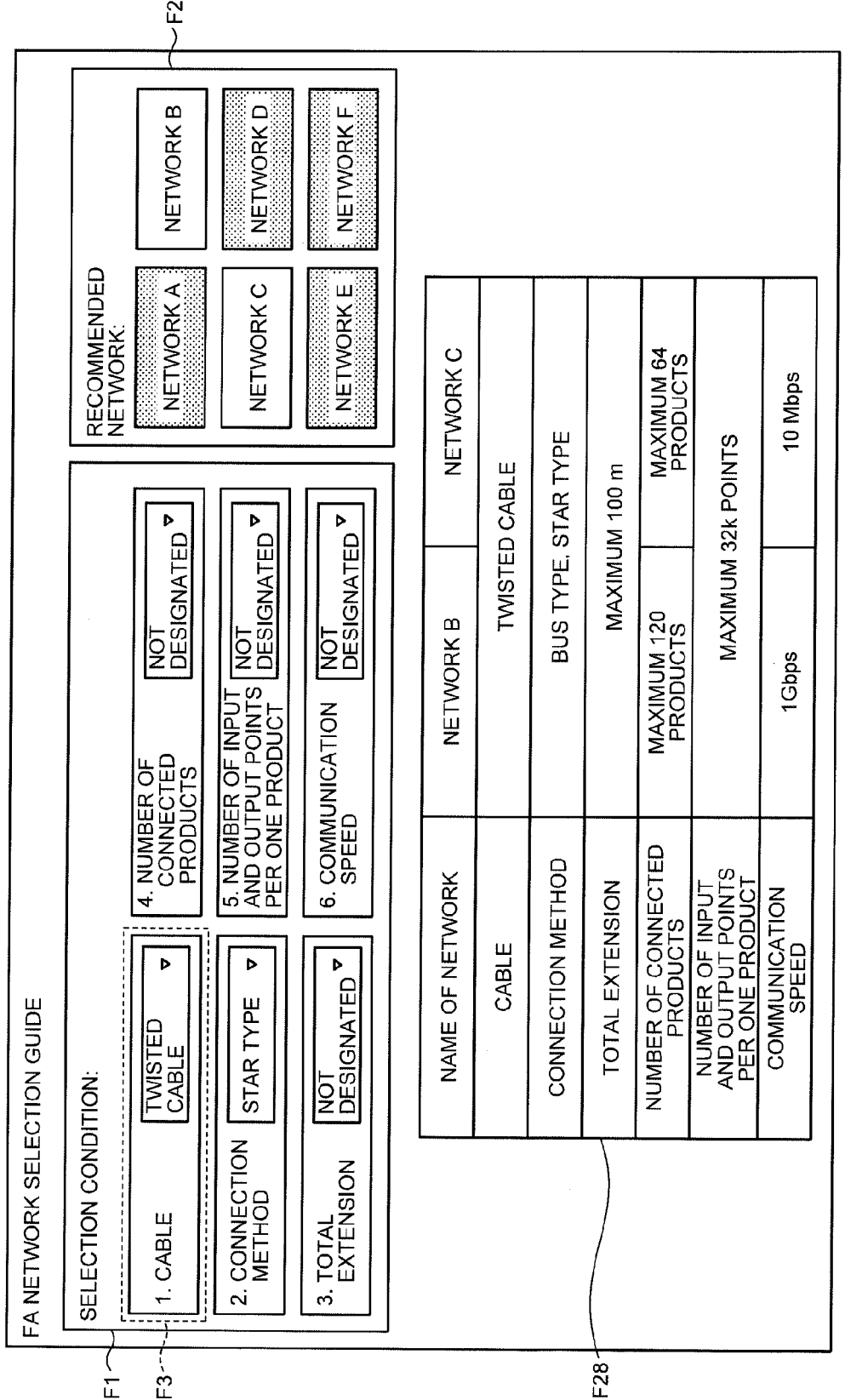
FIG. 25 is a diagram of an example of a display screen.

As shown in FIG. 25, in a state which selection conditions are input in the condition input screen F1 and a plurality of communication systems are displayed as suitable communication systems on the communication system list display screen F2, a specification comparison table F28 of the communication systems displayed as the suitable communication systems can be displayed. Consequently, the selection of a communication system can be more simplified for the user. The specification comparison table F28 can be configured to be displayed when the number of communication systems displayed as the suitable communication systems is reduced to a predetermined number or less.

Figure 27:
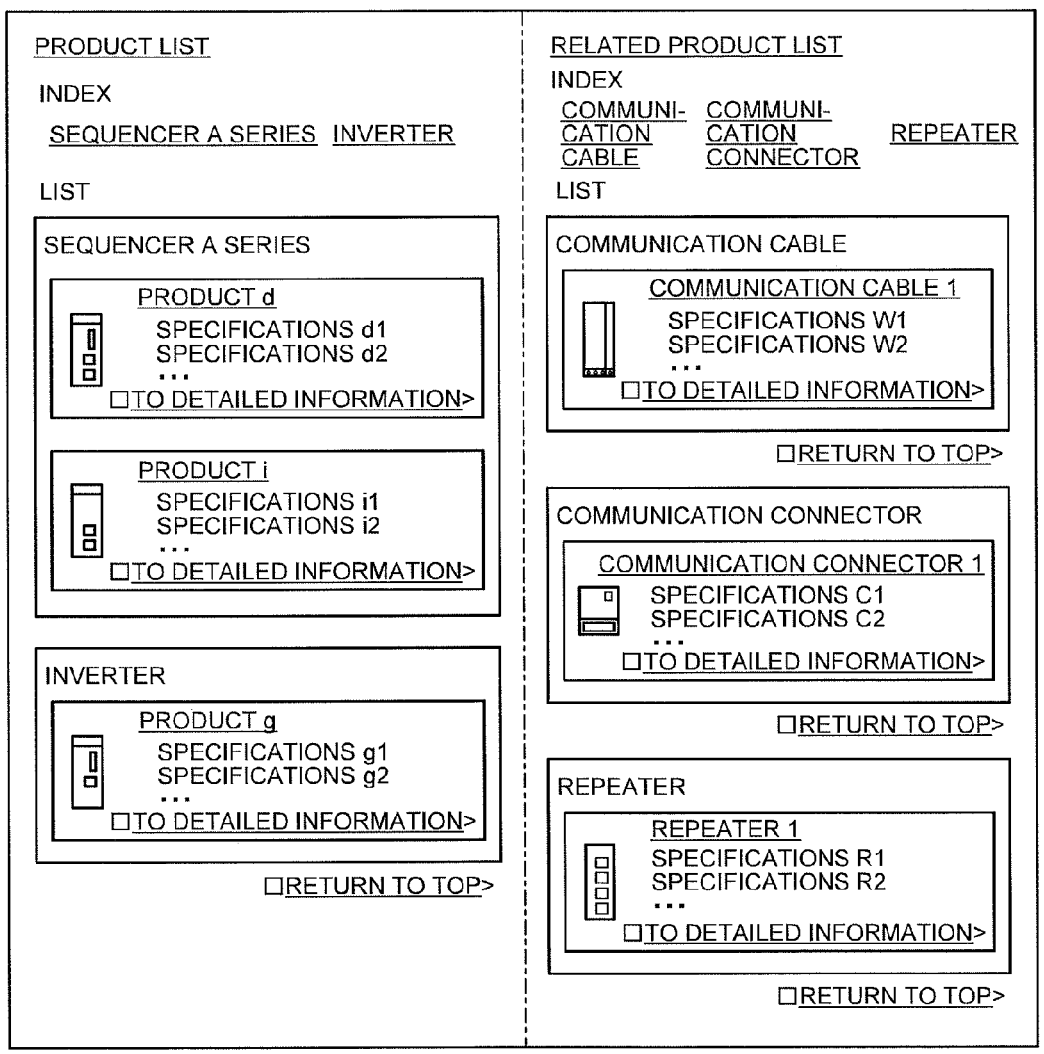
FIG. 27 is a diagram of an example of a display screen.

In the product list screen F11, as shown in FIG. 27, products are classified and displayed for each of types of products such as a sequencer A series and an inverter. This is convenient because the user can easily grasp the lineup of the products. Products of the same type can be displayed dividedly for each of series. The product list screen F11 can be displayed in hierarchies such as a type, a series, and a product. FA products can be displayed on the left side and optimum related products for constructing an FA system such as a cable can be displayed on the right side, whereby the user can be enabled to grasp information concerning related products necessary in constructing a network. Consequently, the user can grasp products related to construction of the FA system in a shorter time. Further, when the FA products and the related products are displayed dividedly on the left and right, there is also an effect that the user can distinguish the FA products and the related products in a shorter time.

Fourth Embodiment.

In the first to third embodiments, the input and output control unit 34 is explained as displaying, when a communication system is selected from the communication system list display screen F2, an explanation concerning the selected communication system on the communication system explanation screen F9. However, even if a communication system is not selected from the communication system list display screen F2, the input and output control unit 34 can display an explanation of all communication systems displayed as suitable communication systems on the communication system explanation screen F9. When a plurality of communication systems are suitable, the input and output control unit 34 can switch and display, for each unit time, an explanation of each of communication systems related to the communication systems. The input and output control unit 34 can display, on the product list screen F11, a list of products related to all the communication systems displayed as suitable communication systems.

Figure 33:
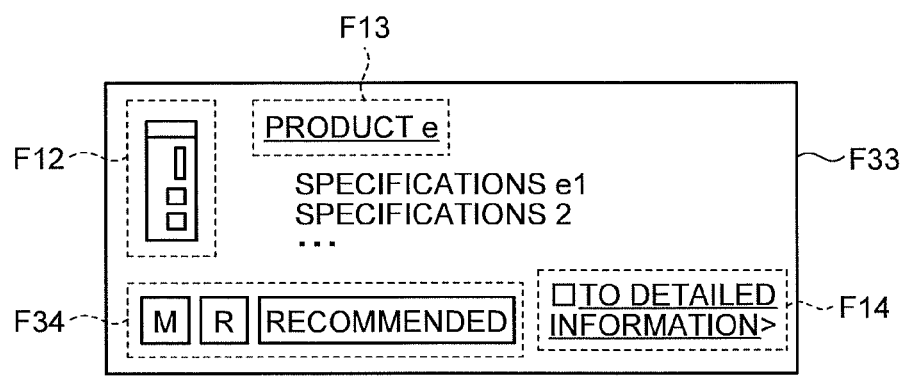
FIG. 33 is a diagram for explaining a display example of a display field for each of products on a product list screen.

The input and output control unit 34 can display an icon for facilitating recognition of attributes of products on a display field F33 for each of products on the product list screen F11. FIG. 33 is a diagram for explaining a display example of the display field F33 for each of the products on the product list screen F11. As shown in the figure, the display field F33 for the product includes an icon display field F34 in which an icon "M" indicating that the product is suitable for a master station, an icon "R" indicating that the product is suitable for a remote station, and an icon "recommended" indicating that the product is a product recommended by a manufacturer are displayed. Which icon is displayed for which product can be designated by adding a column of icons to the table shown in FIG. 6 and writing necessity of display of the icons in the column. A manufacturer of a Web page for network selection support can arbitrarily determine what kind of information is displayed as an attribute.

A check box for removing display can be provided in the display field F33 for each of products on the product list screen F11. When the check box is checked, the input and output control unit 34 can remove the display field F33 related to a checked product from the product list screen F11. A check box can be provided for each of pluralities of products to enable the user to remove the display in the display field F33 for each of the pluralities of products. Consequently, the user can efficiently execute selection of products related to construction of an FA system by hiding information concerning products that are evidently not used.

A check box for detailed display can be provided in the display field F33 for each of products on the product list screen F11. When the check box is checked, the input and output control unit 34 can collectively perform, in a separate window or the like, detailed display related to a checked product. Consequently, the user can provisionally determine a product that is likely to be adopted for construction of an FA system and can efficiently execute selection of products related to the construction of the FA system.

The input and output control unit 34 can record, in the server 1 or the client terminal 3, a history of a product for which the check box for detailed display is checked or the "to detailed information" button F14 is pressed. Because the input and output control unit 34 records the history, the user can check products displayed in detail before. Therefore, the user can efficiently execute selection of products related to construction of an FA system.

The input and output control unit 34 can display, in the display field F33 for each of products on the product list screen F11, model names of accessory products related to the respective products as a list. For example, a cable, a connector, a cap, and a cover correspond to the accessory products.

Fifth Embodiment.

According to a fifth embodiment, the server 1 can store selection conditions input to the condition input screen F1 and, after a Web page for network selection support is closed, when the Web page is opened again, resume selection from a state in which the stored selection conditions are already input.

Figure 34:
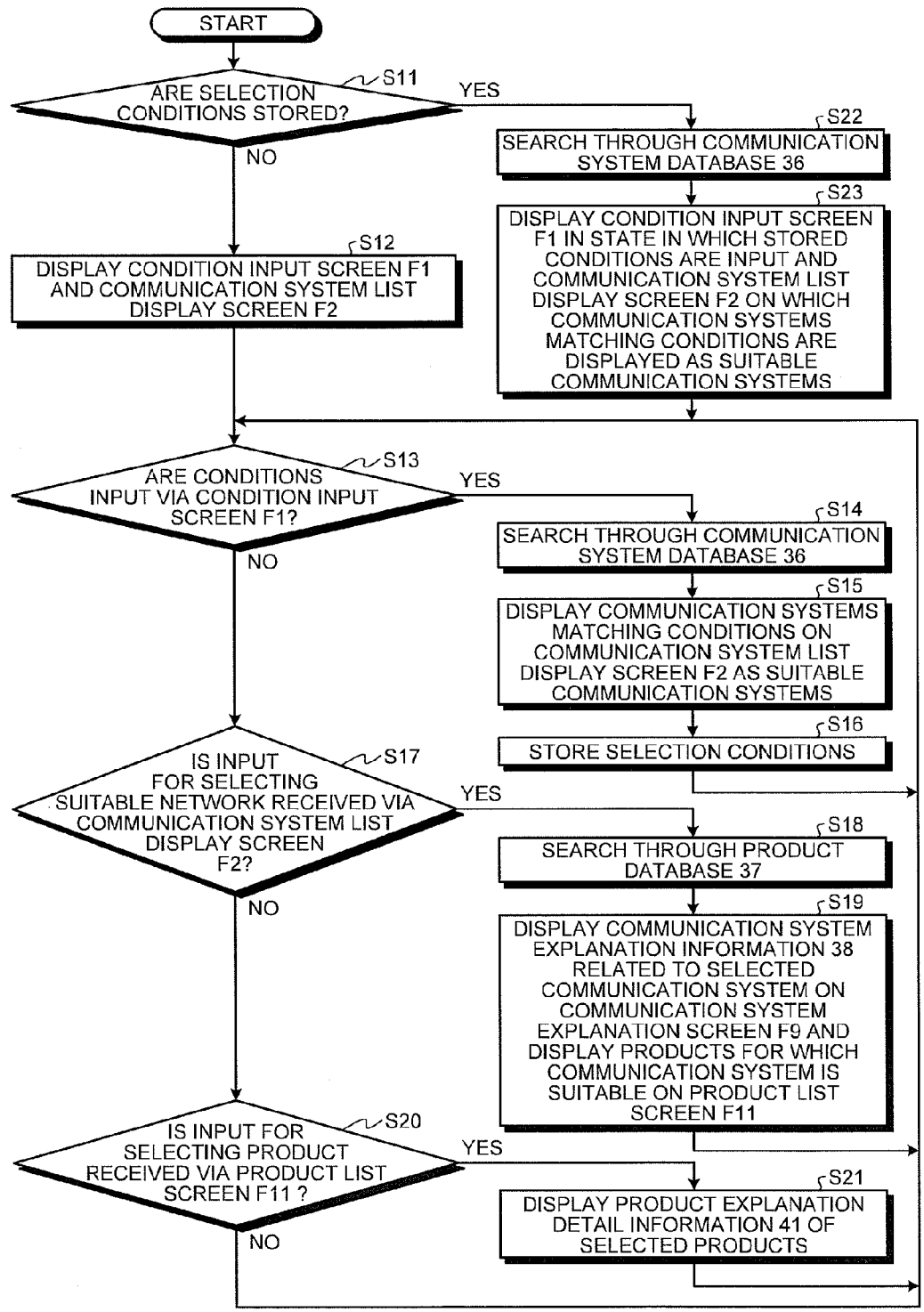
FIG. 34 is a flowchart for explaining a network selection supporting method according to a fifth embodiment.

FIG. 34 is a flowchart for explaining a network selection supporting method according to the fifth embodiment. As shown in the figure, when a user starts a Web page for network selection support, first, the input and output control unit 34 determines whether selection conditions are stored (step S11). Storage of selection conditions is performed at step S16 explained below. A storage place for the selection conditions is not specifically limited. The selection conditions can be stored in the server 1 or the client terminal 3 or both of the server 1 and the client terminal 3.

When selection conditions are not stored (No at step S11), at step S12, the input and output control unit 34 executes processing same as the processing at step S1 explained above. The input and output control unit 34 executes monitoring of an input of selection conditions from the condition input screen F1 (No at step S13), monitoring of an input for selecting one of communication systems displayed as suitable communication systems via the communication system list display screen F2 (No at step S17), and monitoring of an input for selecting a product via the product list screen F11 (No at step S20).

When the input and output control unit 34 receives an input of selection conditions (Yes at step S13), the input and output control unit 34 transfers the received selection conditions to the searching unit 35. The searching unit 35 searches through the communication system database 36 using the transferred selection conditions as search keys (step S14). The searching unit 35 transfers a search result to the input and output control unit 34. The input and output control unit 34 displays, on the communication system list display screen F2, communication systems matching the conditions as suitable communication systems (step S15). The input and output control unit 34 stores the selection conditions used for the search of the communication system database 36 (i.e., selection conditions input after the last clearing) (step S16). The input and output control unit 34 executes the processing at step S13.

Kinds of processing at steps S17 to S21 are respectively the same as the kinds of processing at steps S5 to S9 explained above. Therefore, redundant explanation of the processing is omitted.

When selection conditions are stored (Yes at step S11), the input and output control unit 34 transfers the stored selection conditions to the searching unit 35. The searching unit 35 searches through the communication system database 36 using the transferred selection conditions as search keys (step S22). The searching unit 35 transfers a search result to the input and output control unit 34. The input and output control unit 34 displays the condition input screen F1 in a state in which the stored selection conditions are input and the communication system list display screen F2 on which communication systems matching the stored selection conditions are displayed as suitable communication systems (step S23). The input and output control unit 34 executes the processing at step S13.

In the operation explained above, the input and output control unit 34 determines, based on the determination concerning whether selection conditions are already stored, whether selection conditions stored in the past are used. However, the input and output control unit 34 can determine, based on an instruction input from the user, whether selection conditions stored in the past are used.

Figure 35:
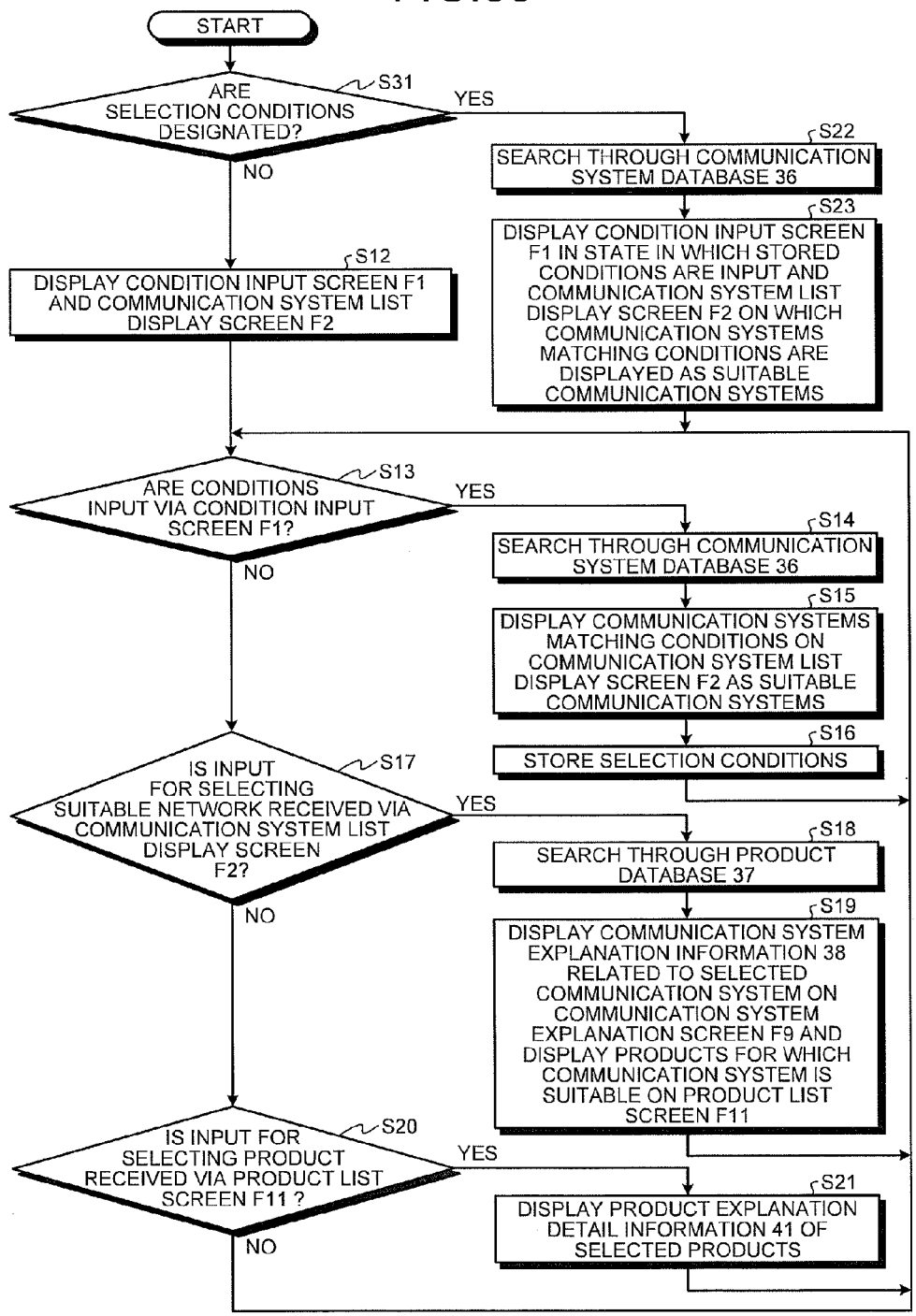
FIG. 35 is a flowchart for explaining the network selection supporting method according to the fifth embodiment.

The input and output control unit 34 can be configured to be capable of receiving an input of designation of selection conditions. The input and output control unit 34 can execute, instead of the processing at step S11 in FIG. 34, the processing at steps S22 and S23 based on "designated conditions" given at the start as in processing at step S31 shown in FIG. 35.

Figure 36:
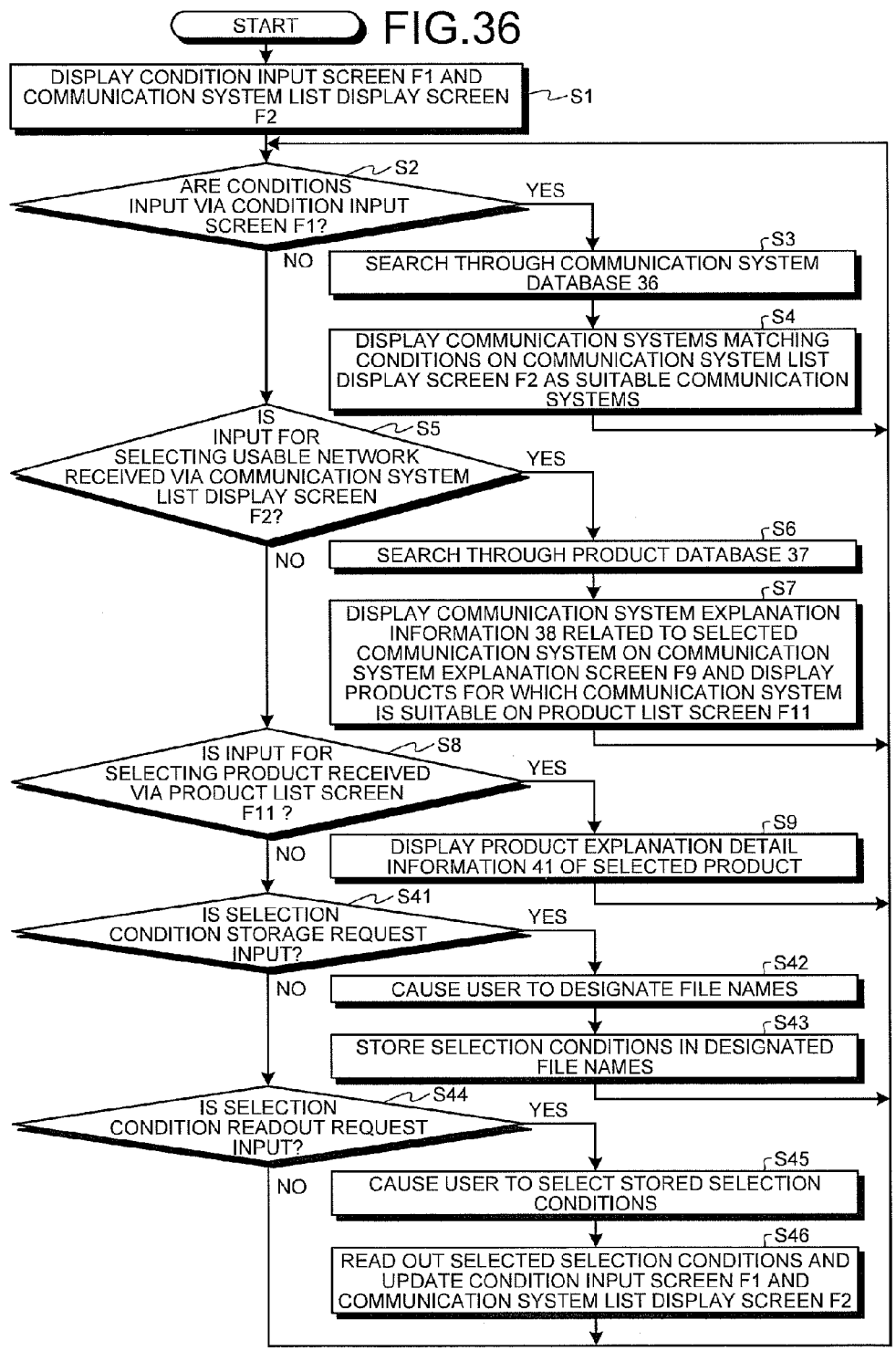
FIG. 36 is a flowchart for explaining the network selection supporting method according to the fifth embodiment.

When executing the processing at step S22, the input and output control unit 34 can urge the user to input file names, give the input file names to the selection conditions, and store the selection conditions. In the processing at step S11, the input and output control unit 34 can display files related to the stored selection conditions as a list and cause the user to select which of the selection conditions is used. FIG. 36 is a flowchart for explaining the network selection supporting method according to the fifth embodiment in which the input and output control unit 34 is configured to be capable of storing a plurality of selection conditions.

Kinds of processing at steps S1 to S9 in FIG. 36 are respectively equal to the kinds of processing at steps S1 to S9 in FIG. 7. Specifically, after performing display of the screen including the selection condition display screen F1 and the communication system list display screen F2 (step S1), the input and output control unit 34 executes monitoring of an input of selection conditions from the condition input screen F1 (No at step S2), monitoring for an input for selecting one of communication systems displayed as suitable communication systems via the communication system list display screen F2 (No at step S5), and monitoring of an input for selecting a product via the product list screen F11 (No at step S8). In addition to these kinds of monitoring, the input and output control unit 34 executes monitoring of an input for a storage request for the selection conditions by the user (No at step S41) and monitoring of an input for a readout request for selection conditions by the user (No at step S44).

When a storage request for the selection conditions is input by the user (Yes at step S41), the input and output control unit 34 performs display for urging the user to input file names and causes the user to designate the file names (step S42). The input and output control unit 34 describes, in files, selection conditions input after the last clearing and stores the files with files having the designated file names attached to the files (step S43).

When a readout request for the selection conditions is input by the user (Yes at step S44), the input and output control unit 34 performs display for urging the user to perform an input for selecting stored files and causes the user to select stored selection conditions (step S45). FIG. 37 is a diagram of display for causing the user to select stored files (condition files). As shown in the figure, on a selection screen F35, names of files are displayed as a list together with storage date and times of the files. The input and output control unit 34 reads out selected condition files and displays the condition input screen F1 and the communication system list display screen F2 based on selection conditions described in the read-out condition files (step S46). In the processing at step S46, the input and output control unit 34 transfers the selection conditions described in the condition files to the searching unit 35. The searching unit 35 searches through the communication system database 36 using the transferred selection conditions as search keys. The searching unit 35 transfers a search result to the input and output control unit 34. The input and output control unit 34 displays the condition input screen F1 in a state in which the stored selection conditions are input and the communication system list display screen F2 in which communication systems matching the stored selection conditions are displayed as suitable communication systems.

As explained above, according to the fifth embodiment of the present invention, the network selection supporting method further includes the selection condition storing step (steps S16 and S43) of storing selection conditions, the second communication system searching step (steps S22 and S46) of searching through the communication system database (network information) 36 and extracting communication systems matching the stored selection conditions, and the second communication system list displaying step (steps S23 and S46) of displaying the communication systems extracted in the second communication system searching step on the communication system list display screen F2 as a list. Therefore, even if work for network selection ends while selection of selection conditions is performed, in resuming the network selection, the user can resume the work from a state in which selection conditions selected at the end of the last work are already input.

The network selection supporting method is configured to give file names to selection conditions every time the selection conditions are stored, display a list of the file names, and cause the user to select one of the stored selection conditions. Therefore, even when a plurality of users perform network selection using the same client terminal 3, each of the users can resume work from a state in which selection conditions selected at the end of the last work are already input.

The system configuration can be a system configuration in which the network 2 shown in FIG. 2 is omitted and the client terminal 3 and the server 1 are integrated.

REFERENCE SIGNS LIST

1 SERVER
2 NETWORK
3 CLIENT TERMINAL
12 to 15 CONTROLLERS
16, 17 SENSORS
18 ROBOT
19, 20 I/O DEVICES
21 to 23 SERVO AMPLIFIERS
24 to 26 SERVOMOTORS
31 ARITHMETIC UNIT
32 STORAGE DEVICE
34 INPUT AND OUTPUT CONTROL UNIT

35 SEARCHING UNIT
36 COMMUNICATION SYSTEM DATABASE
37 PRODUCT DATABASE
38 COMMUNICATION SYSTEM EXPLANATION INFORMATION
39 CONNECTION AND CABLE TABLE
40 PRODUCT EXPLANATION INFORMATION

The invention claimed is:

1. A network selection supporting method comprising:
displaying, on a selection condition display screen, a plurality of selection conditions related to a plurality of communication systems applicable to a network of a factory automation (FA) system;
receiving, from a user, an input of a desired selection condition among the selection conditions displayed on the selection condition display screen;
searching network information indicating a correspondence relation between the plurality of selection conditions and the plurality of communication systems to extract, from the plurality of communication systems, at least one communication system which matches the desired selection condition; and
displaying the at least one extracted communication system, as a list, on a communication system list display screen,
wherein the plurality of communication systems applicable to the network of the FA system comprise at least one of physical specification for communicating in the network of the FA system and logical specification for communicating in the network of the FA system, and
wherein the physical specification comprises communication speed of the network, cable type, and total allowed extension of the cable and the logical specification comprises a connection method selected from among a ring type, a bus type, a star type, and one to one type.

2. The network selection supporting method according to claim 1, further comprising:
receiving a selection of a communication system displayed in the list; and displaying, on a communication system explanation screen, an explanation of the selected communication system.

3. The network selection supporting method according to claim 2,
wherein, the selection condition display screen and the communication system list display screen are hidden and the communication system explanation screen is displayed, and
wherein the network selection supporting method further comprises reducing the communication system explanation screen and displaying the hidden selection condition display screen.

4. The network selection supporting method according to claim 3, further comprising hiding the reduced communication system explanation screen and displaying the hidden communication system list display screen.

5. The network selection supporting method according to claim 2, further comprising:
receiving an input requesting switching an explanation displayed on the communication system explanation screen; and
in response to the input requesting switching, switching the explanation displayed on the communication system explanation screen to an explanation of another communication system extracted in said searching.

6. The network selection supporting method according to claim 2,
wherein the selection condition display screen and the communication system list display screen are hidden and the communication system explanation screen is displayed, and
wherein the network selection supporting method further comprises hiding the communication system explanation screen and displaying the hidden selection condition display screen and communication system list display screen.

7. The network selection supporting method according to claim 2,
wherein in the explanation displaying, the communication system list display screen is hidden and the communication system explanation screen is displayed, and
wherein the network selection supporting method further comprises hiding the communication system explanation screen and displaying the hidden communication system list display screen.

8. The network selection supporting method according to claim 1, further comprising:
receiving a selection of a communication system displayed in the list; and
searching product information comprising information about a relationship between the selected communication system and FA products connectable to the selected communication system and displaying, as a list, at least one FA product connectable to the selected communication system on a product list screen.

9. The network selection supporting method according to claim 8, further comprising:
receiving an input of selecting an FA product displayed on the product list screen; and
displaying a detailed explanation of the FA product selected according to the received input.

10. The network selection supporting method according to claim 8, wherein, an FA product that is connectable to the selected communication system and satisfies the selected condition, is displayed as a list on the product list screen by searching the product information.

11. The network selection supporting method according to claim 8, wherein the product list displaying further comprises displaying, as an icon, attribute information about each FA product in a display field for said each FA product of the product list screen.

12. The network selection supporting method according to claim 1, wherein the plurality of selection conditions include a selection condition related to a function or a characteristic of the communication system of the network applied to the FA system.

13. The network selection supporting method according to claim 1, wherein the plurality of selection conditions include a selection condition related to a use of the network applied to the FA system.

14. The network selection supporting method according to claim 1, wherein the plurality of selection conditions include a selection condition related to a type of a product.

15. The network selection supporting method according to claim 14, further comprising displaying a notification indicating that a product comprising a master station is necessary in response to a selection of at least one additional selection condition related to the type of the product and that a selection condition related to a type of a product including a master station function not being selected.

16. The network selection supporting method according to claim 14, wherein the selection condition display screen includes an icon of the each type of the product for selecting the selection conditions related to the type of the product, and said receiving of the input of the desired selection condition further comprises:

in response to the icon being selected and a selection condition related to the type of the product corresponding to the icon being selected, displaying the selected icon of the type of the product on the selection condition display screen differently from the icon in an unselected state; and in response to the selected icon being selected again, switching the displaying of the selection condition corresponding to the icon to the unselected state.

17. The network selection supporting method according to claim 14, wherein:

the selection condition display screen includes a selected product display screen for displaying, in response to the selection condition related to the type of the product being selected, an icon of the type of the product related to the selected selection condition, and said receiving of the input of the desired selection condition further comprises, in response to the icon displayed on the selected product display screen being selected, changing the selection condition corresponding to the selected icon to an unselected state.

18. The network selection supporting method according to claim 1, further comprising in response to the-receiving the input of the selection condition, setting, as unselectable, at least one other selection condition, from among the plurality of selection conditions displayed on the selection condition display screen, which is incompatible with the selected condition.

19. The network selection supporting method according to claim 1, further comprising displaying a specification comparison table of the communication systems extracted in the searching.

20. The network selection supporting method according to claim 19, wherein, during said displaying of the specification comparison table, in response to a number of communication systems extracted by the searching being equal to or smaller than a predetermined number, displaying a specification comparison table of the extracted respective communication systems.

21. The network selection supporting method according to claim 1, further comprising executing the searching every time the input of the input selection condition is changed and displaying, as the list, the extracted communication systems on the communication system list display screen.

22. The network selection supporting method according to claim 1, further comprising:

receiving an input of requesting an execution of the searching; and requesting execution of the searching according to the request.

23. The network selection supporting method according to claim 1, wherein an image related to an option of the selection conditions is displayed on the selection condition display screen.

24. The network selection supporting method according to claim 1, wherein an explanatory sentence related to an option of the selection conditions is displayed on the selection condition display screen.

25. The network selection supporting method according to claim 1, wherein said displaying of the list further comprises in response to a cursor being placed on one of the communication systems in the list, popup displaying an explanatory sentence related to said one communication system on which the cursor is placed.

26. The network selection supporting method according to claim 1, further comprising:

storing the selected condition;

further searching the network information and extracting a communication system matching the stored selected condition; and displaying, as the list, the communication system extracted in the further searching on the communication system list display screen.

27. The network selection supporting method according to claim 26, wherein:

the selection condition storing comprises assigning, every time the received, selected condition, is stored, a file name to the selected condition, and the further searching comprises displaying a list of a file name and causing the user to select one from the stored selected condition.

28. The network selection supporting method according to claim 1, wherein:

the selection conditions include a first selection condition related to a function or a characteristic of the communication system of the network applied to the FA system and a second selection condition related to a use of the network applied to the FA system, the network selection supporting method further comprises receiving an input designating whether the first selection condition is displayed on the selection condition display screen or the second selection condition is displayed on the selection condition display screen, and a selection condition based on the received input received of designating the first or second selection condition is displayed on the selection condition display screen.

29. The network selection supporting method according to claim 1, wherein the FA system comprises an information network configured to provide communication among controllers and computers, a controller network configured to provide communication among the controllers, and a field network configured to provide communication among the controllers and devices connected thereto, and a servo network configured to provide synchronous communication among one of the controllers, servo motors, and servo amplifiers, and wherein, based on the selection conditions which is a characteristic of an element, the list displayed on the communication system display screen comprises at least one of the physical specification and the logical specification of one of the information network, the controller network, the field network, and the servo network.

30. A network selection supporting apparatus comprising:

a display configured to display a selection condition display screen for displaying, as a list, a plurality of selection conditions related to a plurality of communication systems applicable to a network of a factory automation (FA) system;

an interface configured to receive, from a user, an input of a desired selection condition among the selection conditions displayed on the selection condition display screen;

a memory configured to store network information indicating a correspondence relation between the plurality of selection conditions and the plurality of communication systems; and a processor configured to search the network information to extract, from the plurality of communication systems, at least one communication system which matches the desired selection condition, wherein the display configured to display a communication system list display screen for displaying, as a list, the at least one extracted communication system, and wherein the plurality of communication systems applicable to the network of the FA system comprise at least one of physical specification for communicating in the network of the FA system and logical specification for communicating in the network of the FA system, wherein the physical specification comprises communication speed of the network, cable type, and total allowed extension of the cable and the logical specification comprises a connection method selected from among a ring type, a bus type, a star type, and one to one type.

* * * * *